(12) United States Patent
Lagron et al.

(10) Patent No.: US 6,530,158 B2
(45) Date of Patent: Mar. 11, 2003

(54) LOCATING SYSTEM FOR MOLDING MACHINE CLAMP FRAME

(75) Inventors: Brian G. Lagron, Metamora, IL (US); Brian L. Wegstein, Washburn, IL (US); Randall E. Baldwin, Metamora, IL (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 09/753,629

(22) Filed: Jan. 2, 2001

(65) Prior Publication Data

US 2002/0083611 A1 Jul. 4, 2002

(51) Int. Cl.⁷ .............................................. G01D 21/00
(52) U.S. Cl. ............................. 33/645; 33/613; 33/533
(58) Field of Search .......................... 33/533, 613, 645, 33/562

(56) References Cited

U.S. PATENT DOCUMENTS

| | | | | |
|---|---|---|---|---|
| 4,333,241 A | * | 6/1982 | Wasik et al. | 33/524 |
| 4,345,893 A | * | 8/1982 | Prince | 425/190 |
| 4,425,091 A | * | 1/1984 | Prince | 425/450.1 |
| 4,500,275 A | * | 2/1985 | Ruhl | 249/139 |
| 4,558,521 A | * | 12/1985 | Steck et al. | 33/533 |
| 5,220,730 A | * | 6/1993 | Cangelosi | 33/533 |
| 5,752,578 A | * | 5/1998 | Kellogg | 180/414 |
| 5,797,193 A | * | 8/1998 | Amend et al. | 33/614 |
| 5,876,766 A | * | 3/1999 | Chou | 425/126.1 |
| 5,909,940 A | * | 6/1999 | Baldock | 33/288 |
| 5,987,766 A | * | 11/1999 | Wawczak | 33/613 |
| 6,209,218 B1 | * | 4/2001 | Della Polla | 33/628 |
| 6,209,775 B1 | * | 4/2001 | McKibben | 228/138 |
| 6,257,865 B1 | * | 7/2001 | Rondeau | 425/385 |
| 6,282,852 B1 | * | 9/2001 | Walcker | 33/194 |
| 6,431,851 B1 | * | 8/2002 | Ellinger | 425/450.1 |

* cited by examiner

*Primary Examiner*—Diego Gutierrez
*Assistant Examiner*—Yaritza Guadalupe
(74) *Attorney, Agent, or Firm*—Leydig, Voit & Mayer Ltd.

(57) ABSTRACT

A locating system for an adjustable clamp frame of a molding machine is disclosed. The locating system can be used to repeatably configure the clamp frame to an appropriate perimeter size for a desired mold without the use of measurements or the mold itself. The inventive locating system includes two sets of a first and a second plate, a pair of end locating members, two sets of a first and a second bracket, and a pair of side locating members. The locating members, the plates, and the brackets each include indicia to provide an assembly code that can be used to facilitate configuring the clamp frame.

36 Claims, 18 Drawing Sheets

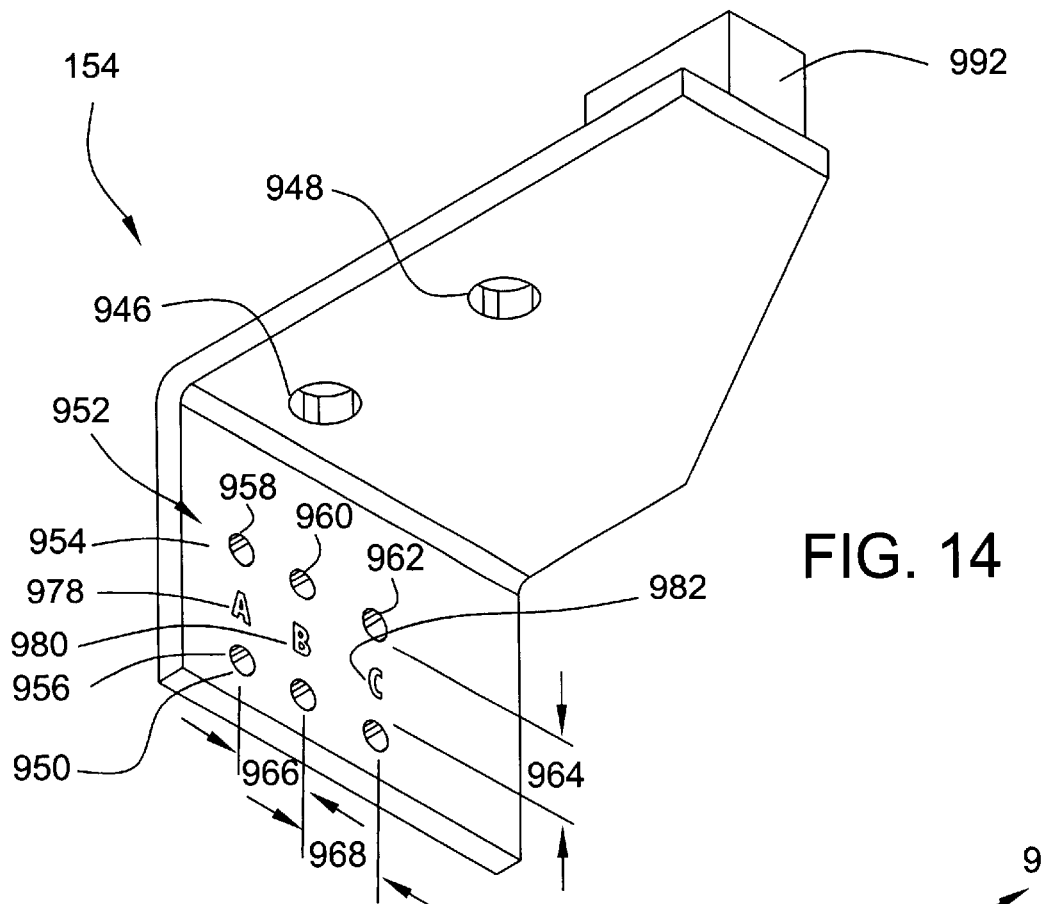
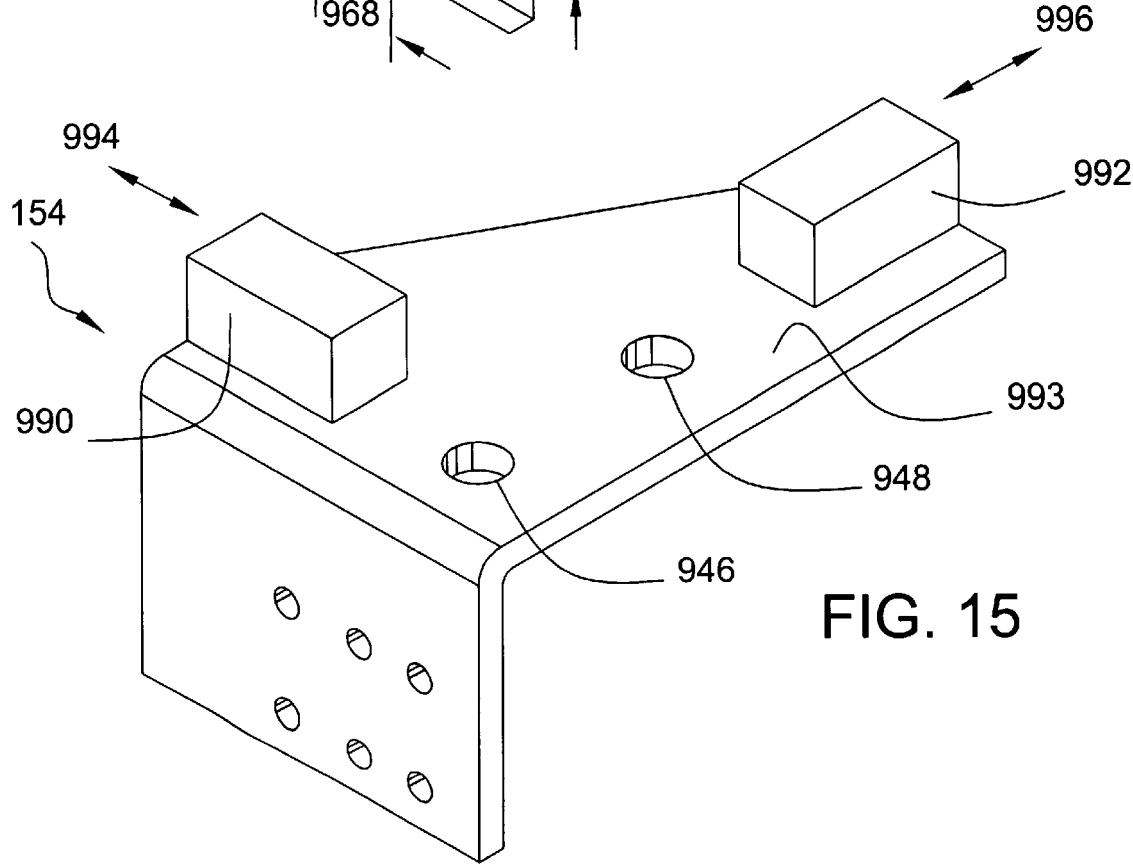

LOCATING SYSTEM FOR MOLDING MACHINE CLAMP FRAME

FIELD OF THE INVENTION

The invention relates generally to a molding machine, and more particularly, to a locating system for a clamp frame.

BACKGROUND OF THE INVENTION

A conventional molding system often includes three stations: a loading station, a heating station, and a forming station. A clamp frame can be provided to hold a sheet of material to be molded. At the loading station, a flat sheet of material is loaded into the clamp frame. At the heating station, the sheet loaded into the frame is heated to a desired temperature. At the forming station, a mold platen or mold platens forms the heated sheet into a desired shape, for example, with the application of a vacuum to draw the heated sheet into the shape of the mold. A user removes the formed sheet from the clamp frame at the loading station. A molding machine can include a plurality of frames that sequentially rotate about a central hub to the stations.

The mold station may be used to mold various articles which use molds of varying dimensions. An adjustable clamp frame configured to accommodate different sized sheets and molds is known in the art. Typically the adjustable frame is sized to the dimension of the desired mold. In the prior art, the clamp frame was adjusted at the forming station by bringing the mold into close contact with the frame and adjusting the perimeter of the frame to approximately conform to the perimeter of the mold, allowing a gap, for example, of ¼ inch. The clamp frame has been adjusted by shimming a gap between the mold and the frames to achieve the proper spacing. Because the clamp frame is adjusted in close proximity to the mold, the mold is susceptible to damage from incidental contact with the user's tools or with the clamp frame.

A typical molding machine includes three clamp frames. Adjusting the three clamp frames typically requires an hour or more. For short production runs, this set-up time greatly increases the costs for the run. When the mold is changed for a different production run, the shimming process must again be repeated for the three clamp frames. Furthermore, the shimming process must be repeated even where a mold that has been used previously in the molding machine is used.

SUMMARY OF THE INVENTION

The invention is directed toward providing a locating system for use with an adjustable clamp frame of a molding machine. The locating system can be used to set up the clamp frame to an appropriate opening for a desired mold. The adjustable clamp frame includes a front and a rear end rail and a left and a right side rail. The inventive locating system includes two sets of a first and a second plate, a pair of left and right locating members, two sets of a first and a second bracket, and a pair of front and rear locating members.

The locating system requires no measuring devices. Each left and right locating member includes a front end, a back end, and a longitudinal midpoint. Each front and rear locating member includes a left end, a right end, a longitudinal axis, and a longitudinal midpoint. Each locating member includes a plurality of holes, including a central hole and a pair of end holes. The holes of each respective locating member are disposed in an array including two rows. Adjacent holes are disposed in alternating rows. The rows are in lateral spaced relation to each other and are disposed substantially parallel to the longitudinal axis. The holes are in spaced relation to each other, such as half-inch spacing between center points of adjacent holes.

Each central hole is disposed at the longitudinal midpoint of the respective locating member. The central hole can be labeled with an indicium, such as the number "0." Additional indicia can be used to mark the remaining holes to identify the respective hole's position relative to the central hole. For example, the indicia can be numbers that are disposed such that the number "1" indicium marks the two holes adjacent to the central hole. Each remaining hole can be identified by a successive integer indicium moving toward the ends of the respective locating member such that the highest numbered indicium, such as "80," marks the end holes.

Each plate and bracket includes a plurality of holes. The holes can be disposed in an array with two rows and three columns. The spacing of the rows can be configured to substantially correspond to the spacing of the rows of the locating members for alignment purposes. The longitudinal spacing of the columns of the respective plates and brackets can be varied. Each column can be labeled with an indicium, such as a letter.

The left and right locating members can be attached, respectively, to a left and a right support arm of a molding machine, for example. The front and rear locating members can be attached, respectively, to the front and rear end rails of the clamp frame. The plates and the brackets are configured to interconnect to the locating members. The first and the second plates can be connected mounted to both the front and the rear rails to form rail assemblies. The plates of the rail assemblies can be mounted to the support arms and the left and right locating members at a desired location by using the indicia found on the left and right locating members and the end plates. The first and second brackets can be connected to the front and rear locating members at a desired location by using the indicia found on the front and rear locating members and the brackets. The side rails of the clamp frame can be mounted to the respective set of first and second brackets.

The inventive locating system allows the clamp frames to be set up at the loading station rather than at the forming station. By setting up the clamp frames at the loading station, the molding machine can be properly configured rapidly. With two workers setting up the clamp frames at the loading station, two other workers can be positioning the desired mold and other components at the forming station at the same time.

Clamp frame set hole positions for a plurality of molds can be recorded on machine set up sheets allowing the machine to be set up consistently and rapidly each time. The locating system provides a tremendous time saving, reducing a machine set up time from a 230 minute average to a 35 minute average, which leads to cost saving and production increases.

Reference is sometimes made herein to the "left," "right," "front," "rear," or other regions of the locating system and its various components. It should be understood that these terms are used solely for convenient reference, inasmuch as the locating system may be used omnidirectionally.

DESCRIPTION OF THE DRAWINGS

FIG. 14 is a bottom perspective view of a first bracket;

FIG. 15 is a top perspective view of the first bracket in FIG. 14;

DETAILED DESCRIPTION OF THE EXEMPLIFIED EMBODIMENTS

Figure 1:
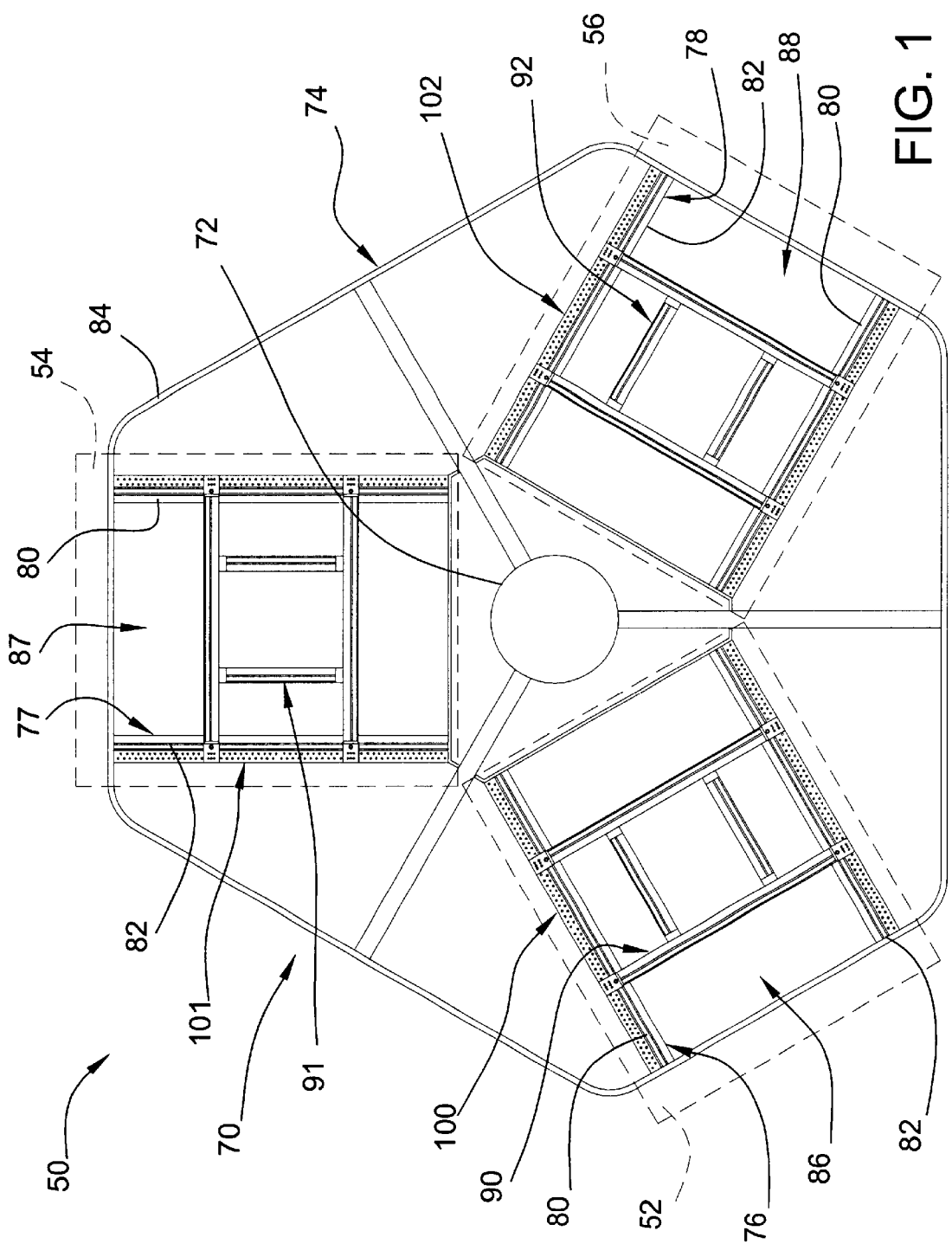
FIG. 1 is a top plan view of a molding machine including a locating system according to the present invention.

The exemplified embodiments of the present invention illustrate a locating system used to facilitate the adjustment of an adjustable clamp frame for use with a molding machine, for example. The locating system includes a plurality of locating members and sets of plates and brackets. The locating members, plates, and brackets are used to ease the set-up of the adjustable clamp frame system. The plates and brackets include mounting holes marked by indicia, preferably alphanumeric indicia, that can be matched to particular mounting holes on the locating members also marked by unique indicia, which is preferably alphanumeric. The indicia on the plates, brackets, and locating members provide an assembly code that can be predetermined. The user can easily set up the adjustable clamp frames according to predetermined assembly codes efficiently and repeatably.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

Turning now to the drawings, there is shown in FIG. 1 an illustrative molding system 50. The molding system 50 includes a loading station 52, a heating station 54, and a forming station 56. The stations are disposed generally in spaced relation to each other about a circle. The molding system 50 includes a molding machine 70. The molding machine 70 is disposed between the stations 52, 54, 56. The molding machine 70 includes a rotatable central hub 72 and a carousel 74 connected to the hub 72. The carousel 74 includes three pairs 76, 77, 78 of left and right support arms 80, 82, respectively, and a perimeter support 84. The pairs 76, 77, 78 of support arms define three clamp frame areas 86, 87, 88, respectively.

The clamp frame areas 86, 87, 88 are rotatable about the central hub 72. Each of the clamp frame areas 86, 87, 88 can be moved sequentially from the loading station 52 to the heating station 54 to the forming station 56 and back to the loading station 52. Each of the clamp frame areas 86, 87, 88 is adapted to accommodate a respective adjustable clamp frame system 90, 91, 92 and a respective locating system 100, 101, 102 according to the present invention. As described herein, the locating system 100 facilitates the proper adjustment of the clamp frame 90 for a desired mold.

The loading station 52 is used to load flat sheets of material into the clamp frames and to unload formed sheets. The heating station 54 is used to heat the sheets loaded in the clamp frames. The heating station 54 generally includes a heating element configured to accommodate the carousel 74 and sized to heat the sheets loaded in the clamp frames. The molding station 56 forms the sheet into a desired shape. The molding station 56 includes a first mold platen and/or a second mold platen disposed such that the platen or platens can engage the sheets loaded in the clamp frames to form a desired shape. In the case where both the first mold platen and the second mold platen are provided, the platens are disposed above and below the carousel 74 such that the platens are aligned with each other. Other equipment, such as a mechanism for providing a vacuum and/or cooling a mold can also be provided.

The locating system of the present invention is simple in its operation. At the loading station 52, the first clamp frame 90 is configured according to a predetermined assembly code set to interact with a desired mold by using the first locating system 100. The first clamp frame 90 is mounted to the first clamp frame area 86. A flat sheet of material is loaded into the clamp frame 90.

The first clamp frame area 86 is moved to the heating station 54. At the heating station 54, the sheet loaded into the clamp frame 90 is heated to a desired temperature. The first clamp frame area 86 is moved to the forming station 56. At the forming station 56, the heated sheet is formed into the shape of a desired mold. A first mold platen and/or a second mold platen is positioned above and below, respectively, the heated sheet. The mold platen or platens can move to the sheet to form the sheet to a desired shape. A vacuum can be applied to draw the heated sheet into the shape of the mold.

The first clamp frame area 86 is then moved to the loading station 52. The newly-formed sheet is removed from the clamp frame 90 and a second flat sheet of material is loaded into the clamp frame 90 with the same setup, and the molding steps can be repeated. Or the adjustable clamp frame 90 can be re-located using the locating system 100, and the mold platen or platens at the molding station 56 can be replaced with another mold platen or platens.

When the first clamp frame area 86 is at the heating station 54, the second clamp frame area 87 is at the loading station. The second adjustable clamp frame 91 is preferably mounted to the second clamp frame area 86 and located using the second locating system 101 according to the present invention. A flat sheet of material is loaded into the second clamp frame 91. When the first clamp frame area 86 is at the molding station 56, the third clamp frame area 88 is at the loading station. The third adjustable clamp frame 92 is preferably mounted to the third clamp frame area 88 and located using the third locating system 102 of the present invention. A flat sheet of material is loaded into the third clamp frame 92.

Each of the clamp frames and locating systems shown in FIG. 1 is similarly constructed. Accordingly, only the first clamp frame 90 and the first locating system 100 will be discussed in detail. It will be understood that the description of the first clamp frame 90 and the first locating system 100 is equally applicable to the other clamp frames 91, 92 and locating systems 101, 102, as well.

Figure 2:
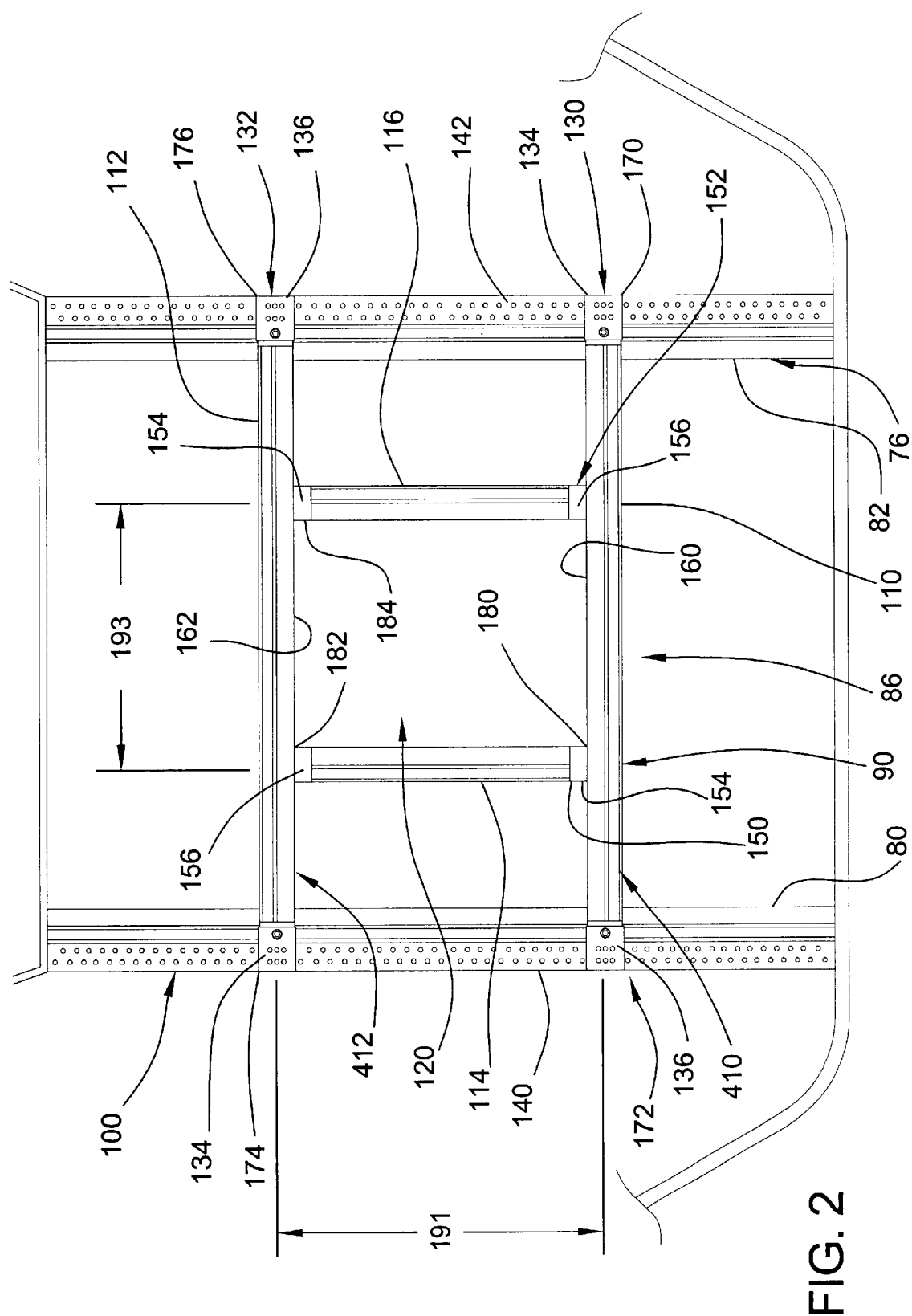
FIG. 2 is a top plan view of a clamp frame assembly mounted to a pair of molding machine support arms.

Referring to FIG. 2, the first pair 76 of left and right support arms 80, 82, respectively, which act to define the first clamping area 86 is shown. The first clamp frame 90 is mounted to the left and right support arms 80, 82. The first locating system 100 is provided to facilitate the setup of the adjustable clamp frame 90 by allowing the user to rapidly determine the proper location of the clamp frame 90 using a predetermined assembly code set. The clamp frame 90 includes a front rail 110, a rear rail 112, a left rail 114, and a right rail 116. The rails 110, 112, 114, 116 are preferably assembled to provide a rectangular opening 120. The size of the opening 120 can be varied in width and/or length.

The locating system 100 facilitates the adjustment of the size of the opening 120 by readily indicating a desired size through the use of the assembly code set. The inventive locating system 100 includes two sets 130, 132 of a first and a second plate 134, 136, a left and a right locating member 140, 142, two sets 150, 152 of a first and a second bracket 154, 156, and a front and a rear locating member 160, 162.

The left and right locating members 140, 142 are connected to the left and right support arms 80, 82, respectively. The sets 130, 132 of plates 134, 136 are mounted to the front and rear rails 110, 112 to provide front and rear rail assemblies 410, 412, respectively. The front and rear rail assemblies 410, 412 can be positioned at a predetermined, desired position along the left and right locating members 140, 142 by aligning indicia found on the locating members 140, 142 and the plates 134, 136.

The first plates 134 are mounted in opposing first and third corners 170, 174 of the clamp frame 90. One of the first plates 134 is mounted in the first corner 170 to the front rail 110 and the right support arm 82. The other of the first plates 134 is mounted in the third corner 174 to the rear rail 112 and the left support arm 80. The second plates 136 are mounted in opposing second and fourth corners 172, 176 of the clamp frame 90. One of the second plates 136 is mounted in the second corner 172 to the front rail 110 and the left support arm 80. The other of the second plates 136 is mounted in the fourth corner 176 to the rear rail 112 and the right support arm 82.

The front and rear locating members 160, 162 are connected to the front and rear rails 110, 112, respectively. Two sets 150, 152 of brackets 154, 156 are mounted to the left and right rails 114, 116, respectively. The first brackets 154 are mounted in opposing fifth and seventh corners 180, 184 of the clamp frame 90. One of the first brackets 154 is mounted in the fifth corner 180 to the left rail 114 and the front locating member 160. The other of the first brackets 154 is mounted in the seventh corner 184 to the right rail 116 and the rear locating member 162. The second brackets 156 are mounted in opposing sixth and eighth corners 182, 186 of the clamp frame 90. One of the second brackets 156 is mounted in the sixth corner 182 to the left rail 114 and the rear locating member 162. The other of the second brackets 156 is mounted in the eighth corner 186 to the right rail 116 and the front locating member 160.

Figure 3:
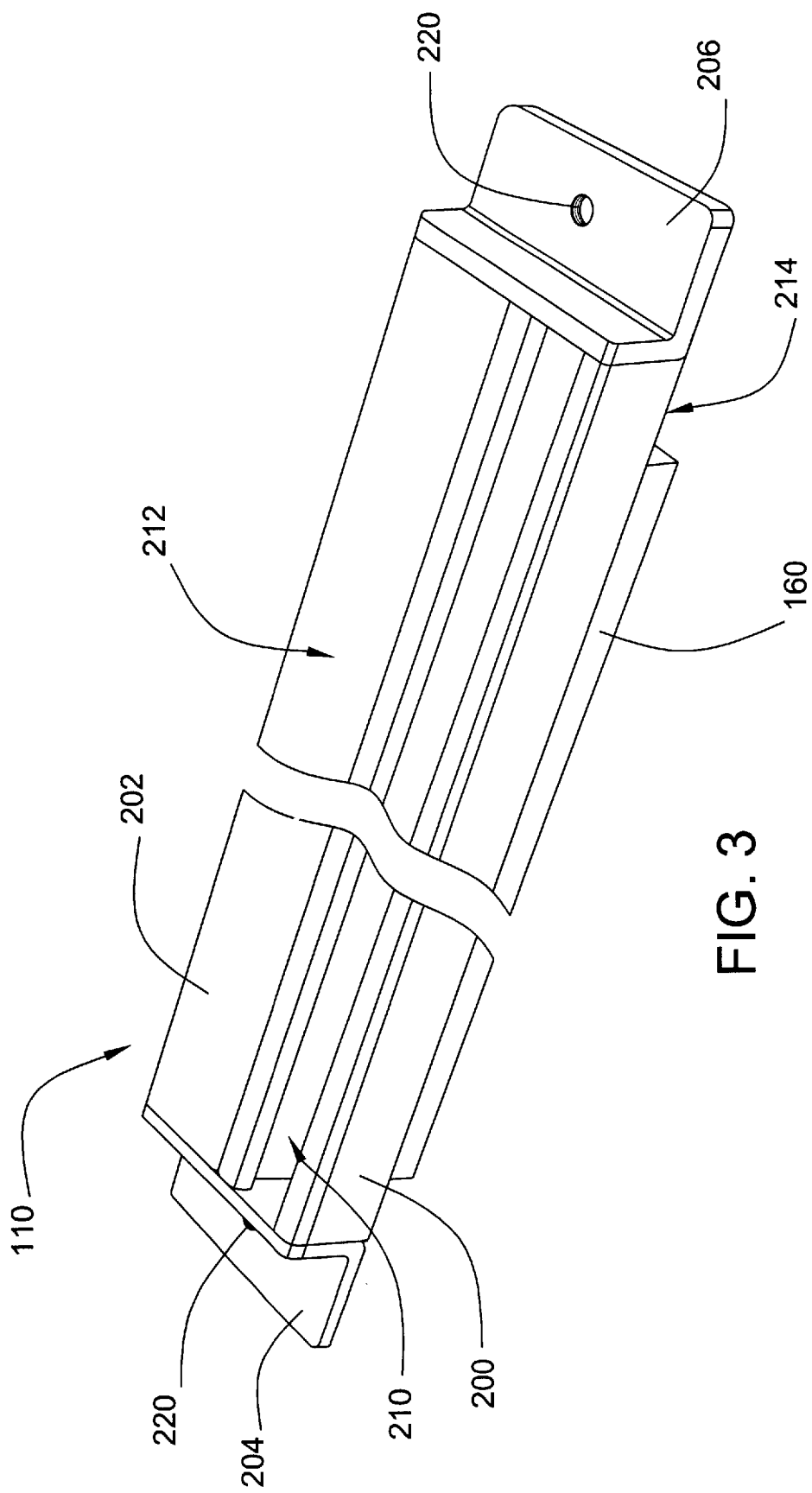
FIG. 3 is a perspective view of a front rail.
Figure 12:
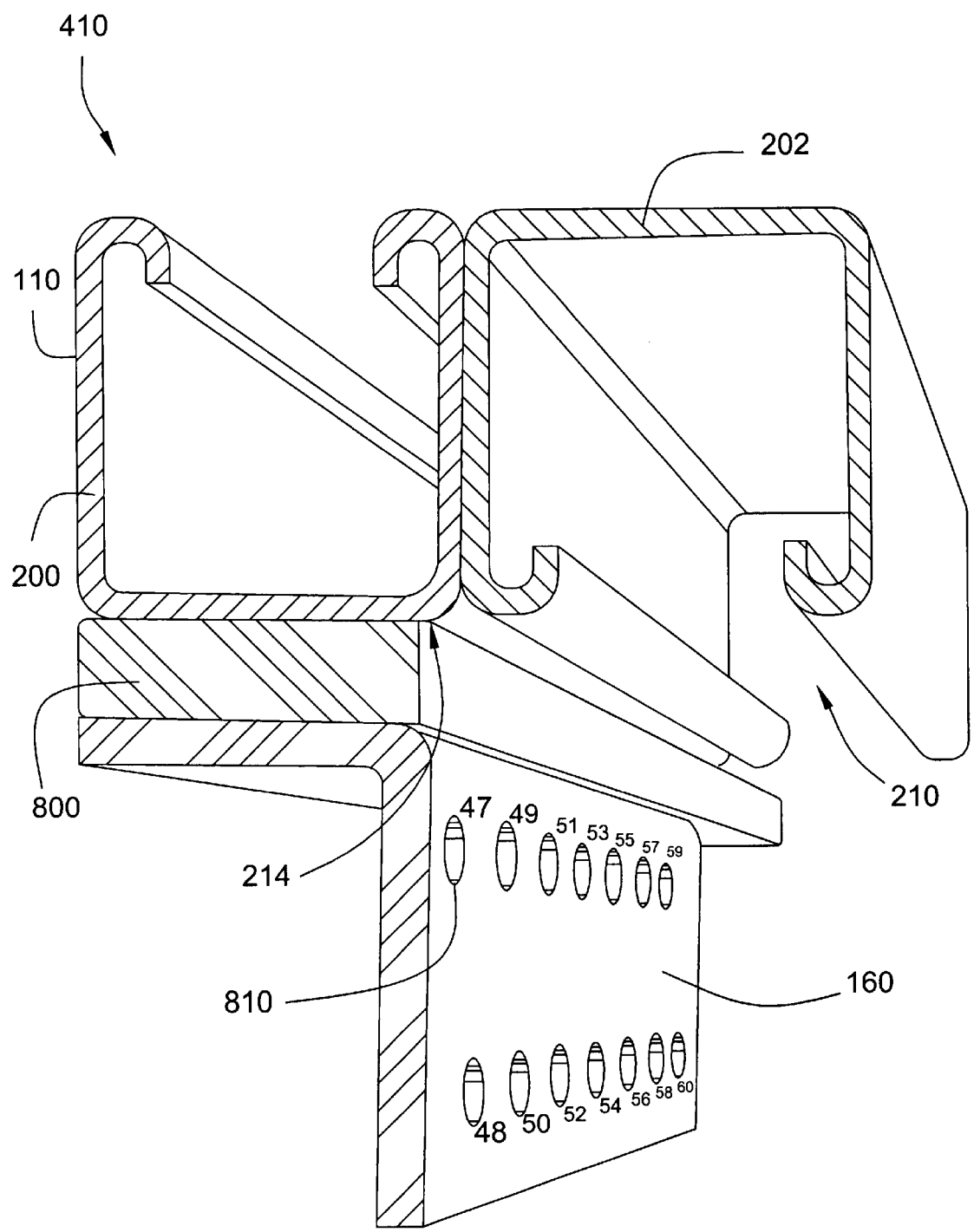
FIG. 12 is a fragmentary perspective view of the front rail assembly.

Referring to FIG. 3, the front rail 110 is shown. The illustrative front rail 110 includes a first channel 200, a second channel 202, and a left and a right end bracket 204, 206. The front locating member 160 is connected to the front rail 110 by, for example, bolts, welds, or other techniques. The first channel 200 and the second channel 202 are similar to each other. Each channel 200, 202 is U-shaped to define a slot 210. The slot 210 can be used for mounting other components such as air piston and clamping bar assemblies. The channels 200, 202 are connected together by, for example, bolts, welds, or other techniques. The slot 210 of the first channel 200 opens to a top surface 212 of the front rail 110. The slot of the second channel 202 opens to a bottom surface 214 of the front rail 110, as best seen in FIG. 12. The exemplified channels 200, 202 are available from GS Metals Corp., Pinckneyville Ill. 62274, under the GLOBESTRUT™ metal framing trade name as part number G-5814X.

The end brackets 204, 206 are connected to the channels 200, 202 by, for example, welds, bolts, or other techniques. Each end bracket 204, 206 includes a mounting hole 220 for mounting the front rail 110 to the left and right support arms, respectively, of the molding machine. The left and the right end brackets 204, 206 accommodate the second and first plates, respectively.

The rear rail 112 shown in FIG. 2 is similar in construction to the front rail 110.

Figure 4:
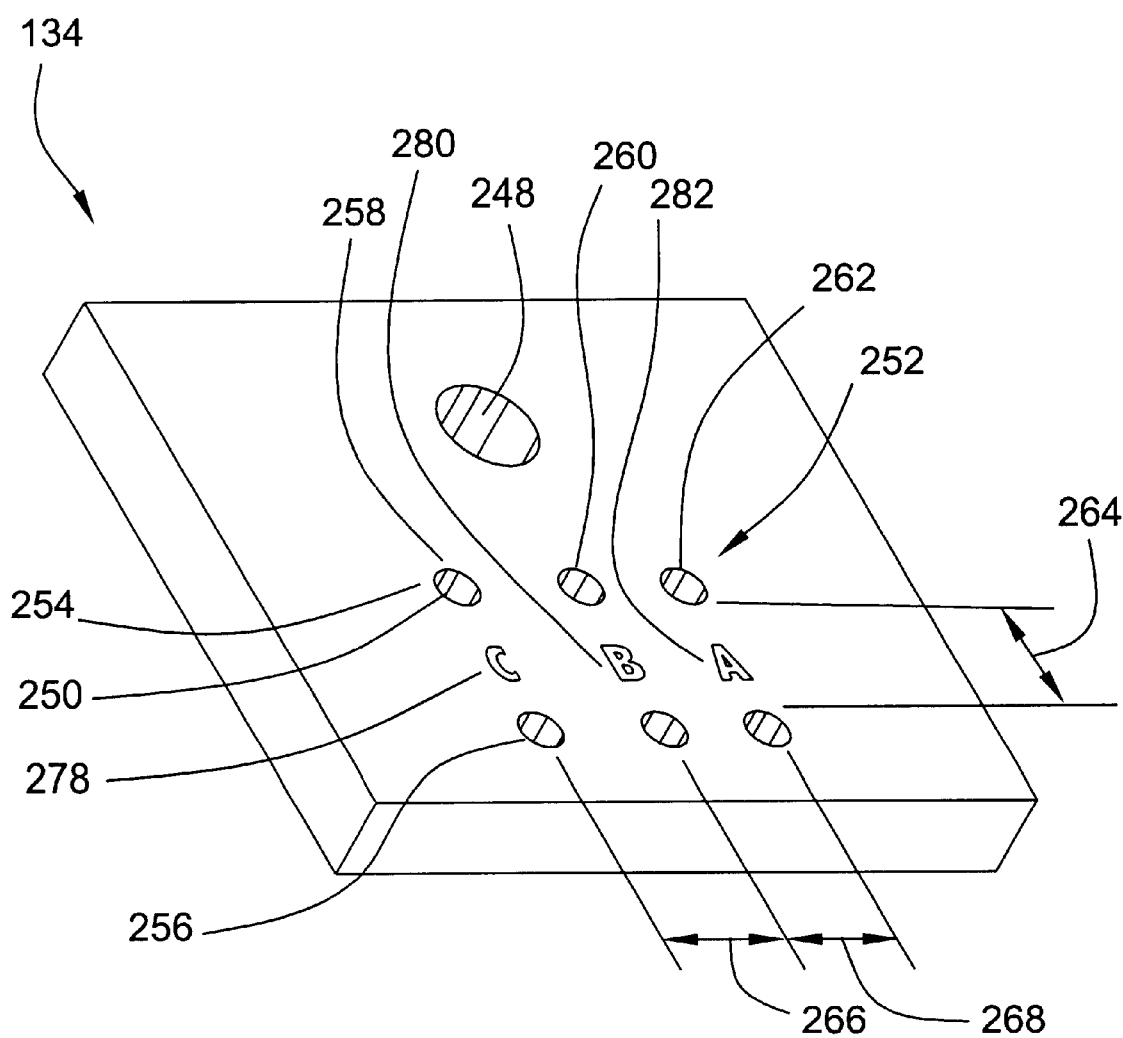
FIG. 4 is a perspective view of first plate.

Referring to FIG. 4, the first plate 134 is shown. The first plate 134 includes a mounting hole 248 and a plurality of locating holes 250. The mounting hole 248 of the first plate 134 is configured to align with the mounting hole of the right end bracket of the front rail. The locating holes 250 can be disposed in an array 252 with two rows 254, 256 and three columns 258, 260, 262. The rows 254, 256 are substantially linear and are in lateral spaced relation to each other at a selected first distance 264. The selected first distance 264 preferably substantially corresponds to the spacing of the rows of holes of the left locating member 140 for alignment purposes, as shown in FIG. 2. The first column 258 and the second column 260 are in spaced relation to each other and are separated a selected second distance 266. The second column 260 and the third column 262 are in spaced relation to each other and are separated a selected third distance 268. The selected second distance 266 and the selected third distance 268 may be the same distances or may be different distances. For example, the illustrative second distance 266 is ¾ of an inch, and the illustrative third distance 268 is ⅝ of an inch. The second and third distances 266, 268 can be varied.

Each first plate column 258, 260, 262 is preferably labeled with an indicium 278, 280, 282, respectively, such as an alphanumeric indicium. The illustrative first indicium 278 is the letter "C." The illustrative second indicium 280 is the letter "B." The illustrative third indicium 282 is the letter "A." The indicia 278, 280, 282 can be used as a portion of an assembly code to readily assembly the clamp frame. It will be understood that in other embodiments, the indicia can be varied.

Figure 5:
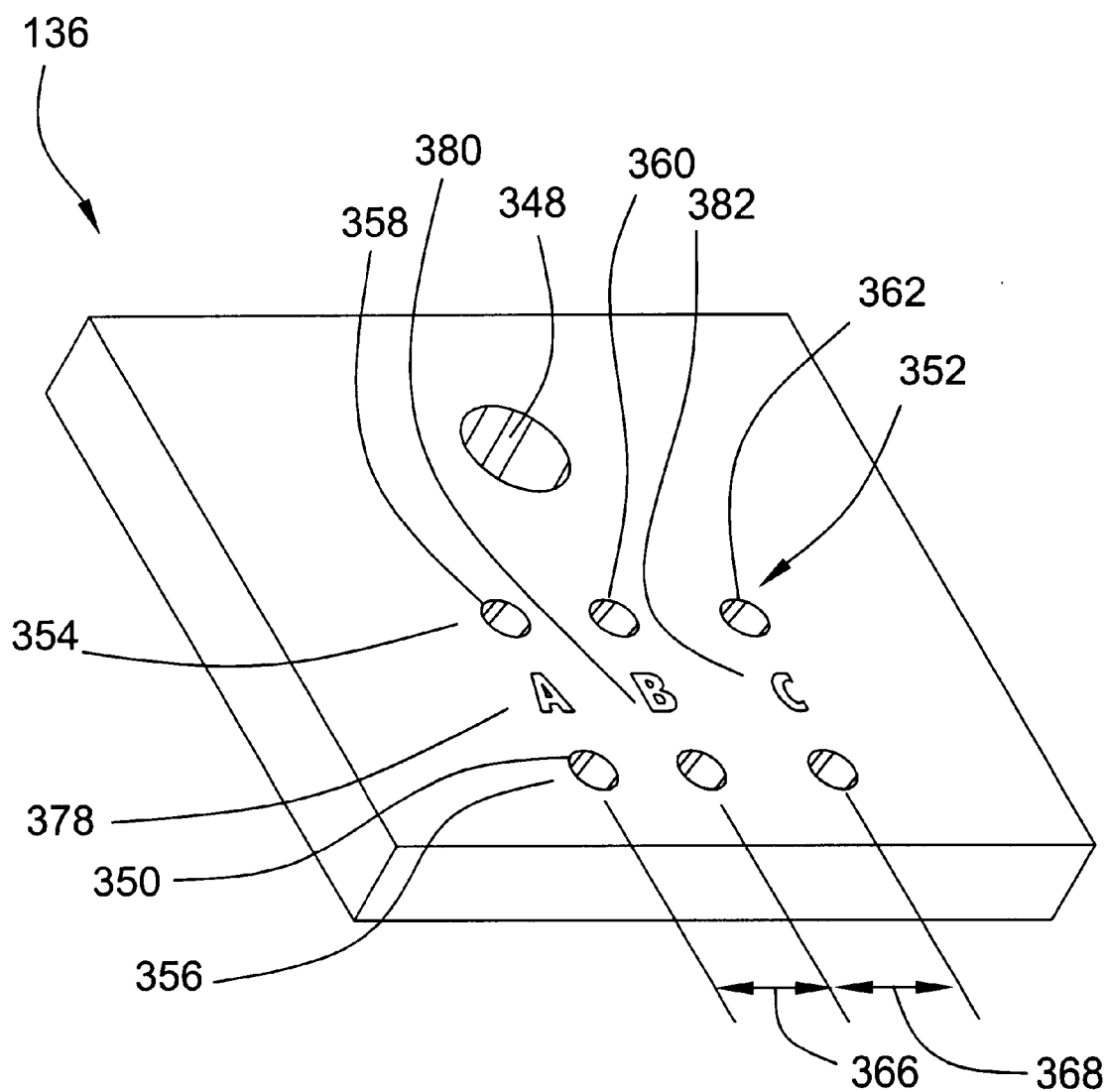
FIG. 5 is a perspective view of a second plate.

Referring to FIG. 5, a second plate 136 is shown. The second plate 136 is preferably configured to correspond to the first plate. The second plate 136 includes a mounting hole 348 and a plurality of locating holes 350. The mounting hole 348 of the second plate 136 is configured to align with the mounting hole of the left end bracket of the front rail. The locating holes 350 of the second plate 136 are disposed in an array 352 with two rows 354, 356 and three columns 358, 360, 362. The first column 358 and the second column 360 are in spaced relation to each other and are separated a selected second distance 366. The second column 360 and the third column 362 are in spaced relation to each other and are separated a selected third distance 368. The second distance 366 and the third distance 368 may be the same distance or may be different. For example, the illustrative second distance 366 is ⅝ of an inch, and the illustrative third distance 368 is ¾ of an inch. The second and third distances 366, 368 can be varied.

Each second plate column 358, 360, 362 is preferably labeled with an indicium 378, 380, 382, respectively, such as an alphanumeric indicium. The indicium 378, 380, 382 preferably corresponds to the indicium of the first plate. For example, the illustrative first indicium 378 is the letter "A." The illustrative second indicium 380 is the letter "B." The illustrative third indicium 382 is the letter "C." The second plate 136 is similar to the first plate in other respects. Tindicia 378, 380, 382 can be used as a portion of an assembly the clamp frame. It will be understood that in other embodiments, the indicia can be varied.

Figure 6:
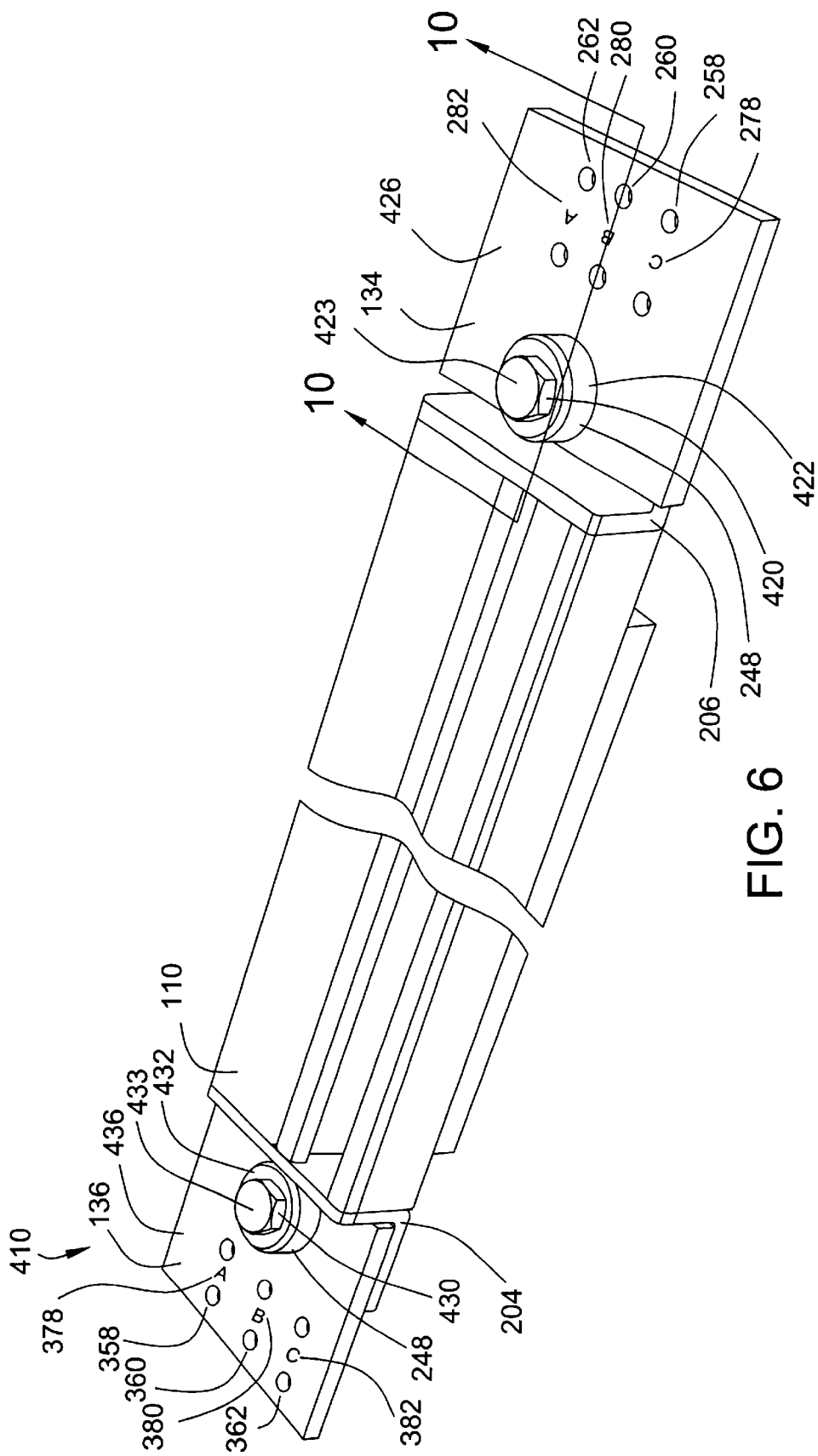
FIG. 6 is a perspective view of a front rail assembly.

At least a first plate is mounted to one end of the front rail. Preferably the first and the second plates are mounted to each end, respectively, of the front rail. Referring to FIG. 6, the first and the second plates 134, 136 are each mounted to the front rail 110 to provide a front rail assembly 410 using a bolt, a thrust bearing, and a nut. A first bolt 420 threadedly engages a first thrust bearing 422 and extends through the mounting hole 248 of the first plate 134 and the mounting hole of the right end bracket 206. The first thrust bearing 422 is in close adjacency with an indicia surface 426 of the first plate 134. A first nut threadedly engages the first bolt 420. In like manner, a second bolt 430 threadedly engages a second thrust bearing 432 and extends through the mounting hole 248 of the second plate 136 and the mounting hole of the left end bracket 204. The second thrust bearing 432 is in close adjacency with an indicia surface 436 of the second plate 136. A second nut threadedly engages the second bolt 430. The thrust bearings 422, 432 are provided to prevent the bolts 420, 430 from galling the left and second plates 134, 136. In other embodiments, washers can be used in place of the thrust bearings or the thrust bearings can be omitted.

To readily align the front rail assembly 410 by using a single assembly code, the indicia 278, 280, 282 of the first plate 134 can be aligned respectively with the indicia 382, 380, 378 of the second plate 136 such that the columns 258, 260, 262 of the first plate 134 are respectively aligned with the columns 362, 360, 358 of the second plate 136. For example, an assembly code including a letter designation "A" can direct the user to mount the front rail assembly 410 to the left and right support arms using the third column 262 of the first plate 134 and the first column 358 of the second plate 136.

The rear rail assembly 412 shown in FIG. 2 is preferably constructed in a manner similar to the front rail assembly 410.

Figure 7:
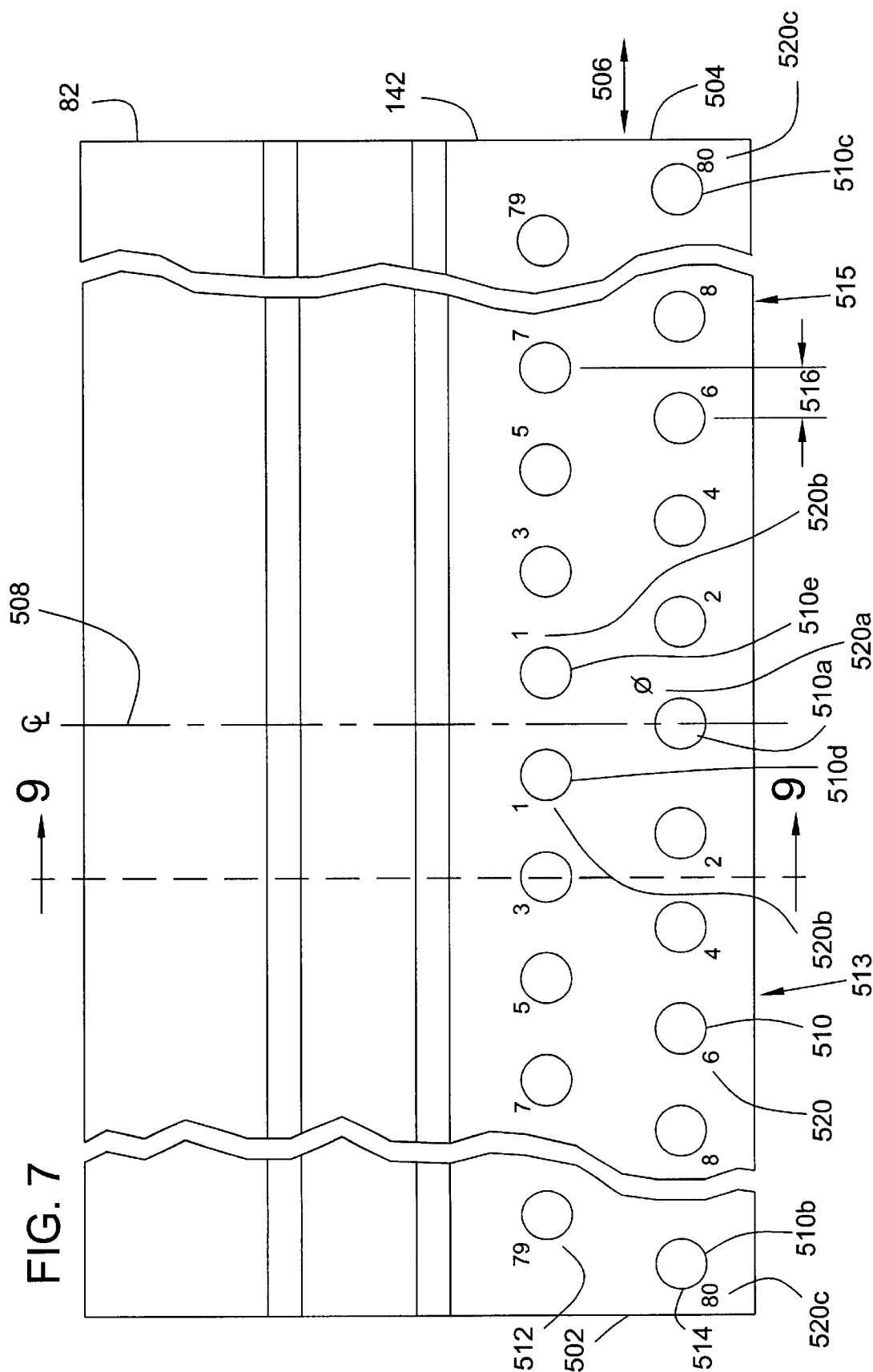
FIG. 7 is a top plan view of a right machine support arm.

FIG. 7 depicts a right locating member 142 connected to the right support arm 82. The right locating member 142 can be used to position the front rail 110 and the rear rail 112 relative to each other such that they are separated a predetermined distance 191, as shown in FIG. 2. The right locating member 142 includes a front end 502, a rear end 504, a longitudinal axis 506, and a centerline 508. The right locating member 142 includes a plurality of locating holes 510, including a central hole 510a and a pair of end holes 510b, 510c. The locating holes 510 are alternately disposed in an array including two rows 512, 514 in lateral spaced relation to each other that are disposed substantially parallel to the longitudinal axis 506. The locating holes 510 are in spaced relation to each other. Adjacent locating holes 510 are separated a uniform, selected distance 516, such as half-inch spacing between center points of alternating adjacent locating holes 510.

The centerline 508 splits the right locating member 142 into a front portion 513 and a rear portion 515. The central hole 510a is disposed at the centerline 508 of the right locating member 142. The central hole 510a can be labeled with an indicium 520a, such as the number "0." Additional indicia 520, such as alphanumeric indicia, can be used to mark the remaining locating holes 510 to identify the position of the respective locating hole 510 relative to the central hole 510a and/or the centerline 508 of the right locating member 142. The front portion 513 and the rear portion 515 use the same indicia 520 for locating holes 510 disposed an equal distance from the central hole 510a.

For example, an indicium 520b to mark the two locating holes 510d, 510e adjacent to the central hole 510a can be the number "1." Each remaining locating hole 510 can be identified by a successive integer indicium 520 moving toward the ends 502, 504 of the right locating member 142 such that the highest numbered indicium, in the illustrative right locating member 142 a number "80" indicium 520c, marks the end holes 510b, 510c. The indicia 520 can be used as a portion of an assembly code to readily assembly the clamp frame. It will be understood that in other embodiments, the longitudinal length of the right locating member 142 and the indicia 520 can be varied. In other embodiments, the indicia can be configured to identify the position of the respective locating hole relative to another position, such as an end hole.

A left locating member 140, shown in FIG. 2, is preferably provided and is preferably similar to the right locating member 142. The left locating member 140 is preferably configured such that its indicia correspond to, and align with, the indicia 520 of the right locating member 142.

Figure 8:
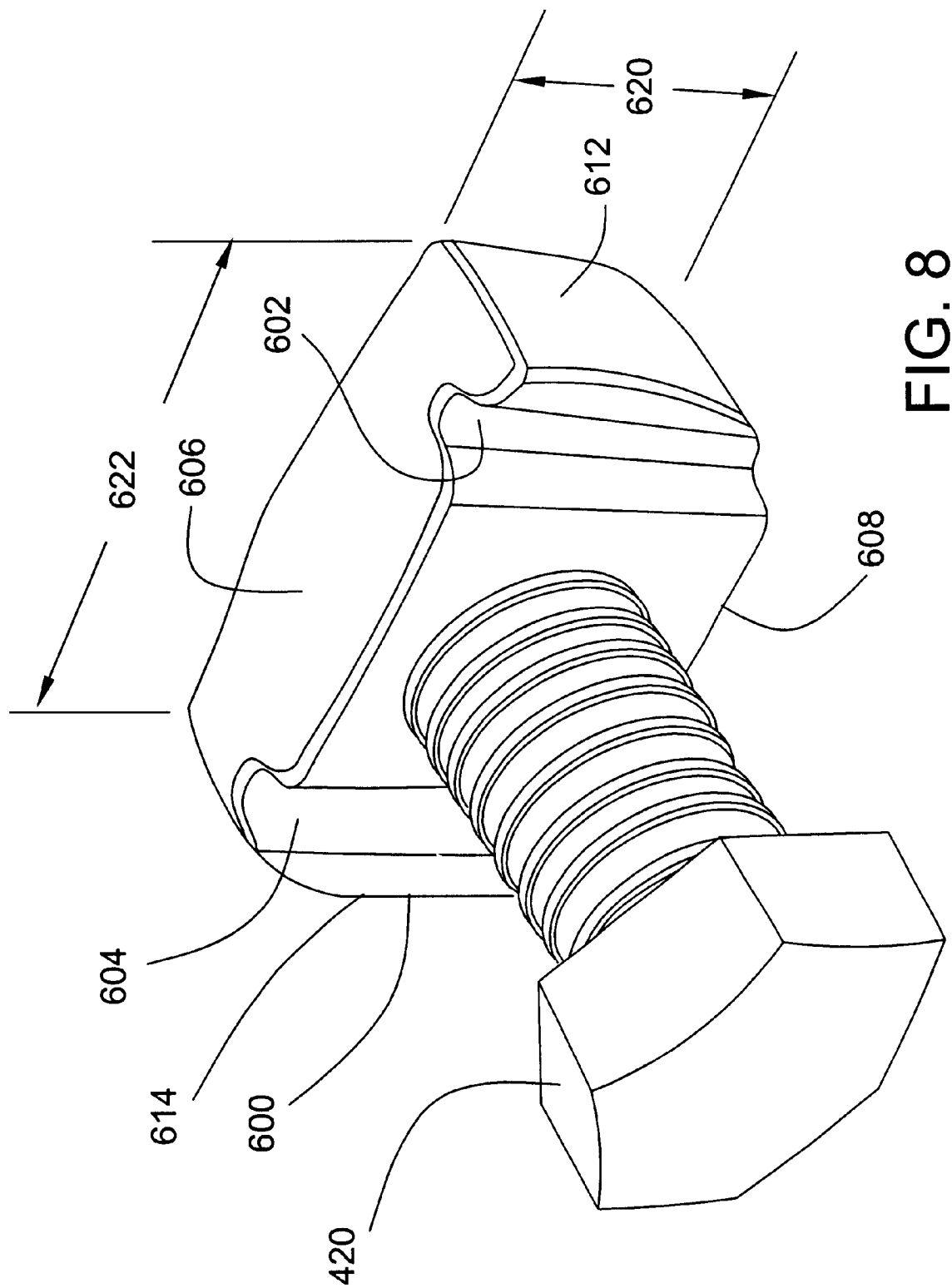
FIG. 8 is a perspective view of a twirl nut.

Referring to FIG. 8, the first bolt 420 and a "twirl" nut 600 are shown for illustrative purposes. The twirl nut 600 is threadedly engaged to the first bolt 420. The twirl nut 600 includes a pair of notches 602, 604 for engaging a channel. The twirl nut 600 includes a pair of sides 606, 608 and a pair of ends 612, 614. A first distance 620 separates the sides 606, 608. A second distance 622 separates the ends 612, 614. The first distance 620 is configured such that it is less than an opening distance 730 of an opening 728 to the slot 710 of the first channel 700 shown in FIG. 9. The second distance 622 is configured such that it is greater than the opening distance 730 of the opening 728 shown in FIG. 9. The exemplified twirl nut 600 is available from GS Metals Corp., Pinckneyville Ill. 62274, under the GLOBESTRUT™ metal framing trade name as part number G-1135 and referred to as a steel channel locknut.

Figure 9:
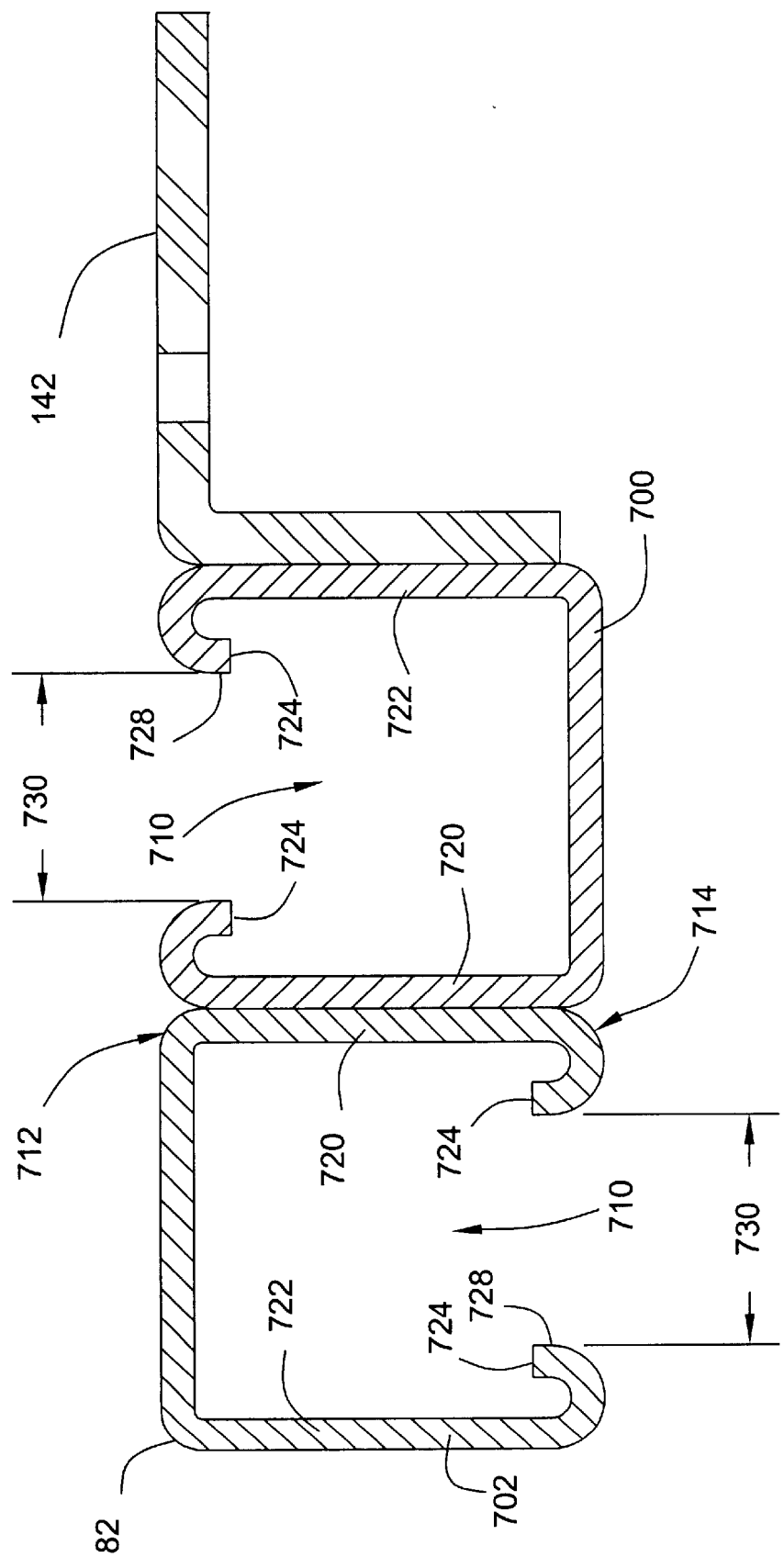
FIG. 9 is a cross-sectional view of a right machine support arm taken along line 9—9 in FIG. 7.

FIG. 9 depicts a right locating member 142 connected to a right support arm 82. The right support arm 82 includes a first channel 700 and a second channel 702. The right locating member 142 is connected to the right support arm 82 by, for example, bolts, welds, or other techniques. Preferably, the locating member 142 is welded to the right support arm 82. The first channel 700 and the second channel 702 are similar to each other.

Each channel 700, 702 is U-shaped to define a slot 710. The slots 710 can be used for mounting other components such as air piston and clamping bar assemblies. The channels 700, 702 are connected together by, for example, bolts, welds, or other techniques. Preferably, the two channels 700, 702 are welded together. The slot 710 of the first channel 700 opens to a top surface 712 of the right support arm 82. The slot 710 of the second channel 702 opens to a bottom surface 714 of the right support arm 82.

Each channel 700, 702 includes a pair of side walls 720, 722 having hooked ends 724. The hooked ends 724 are in spaced relation to each other and define an opening 728 having a selected opening distance 730. The opening distance 730 is configured such that the twirl nut 600 shown in FIG. 8 can fit through the opening 728 when the sides 606, 608 of the nut 600 are oriented parallel to the side walls 720, 722.

The exemplified channels 700, 702 are available from GS Metals Corp., Pinckneyville Ill. 62274, under the GLOBESTRUT™ metal framing trade name as part number G-5814X.

Figure 10:
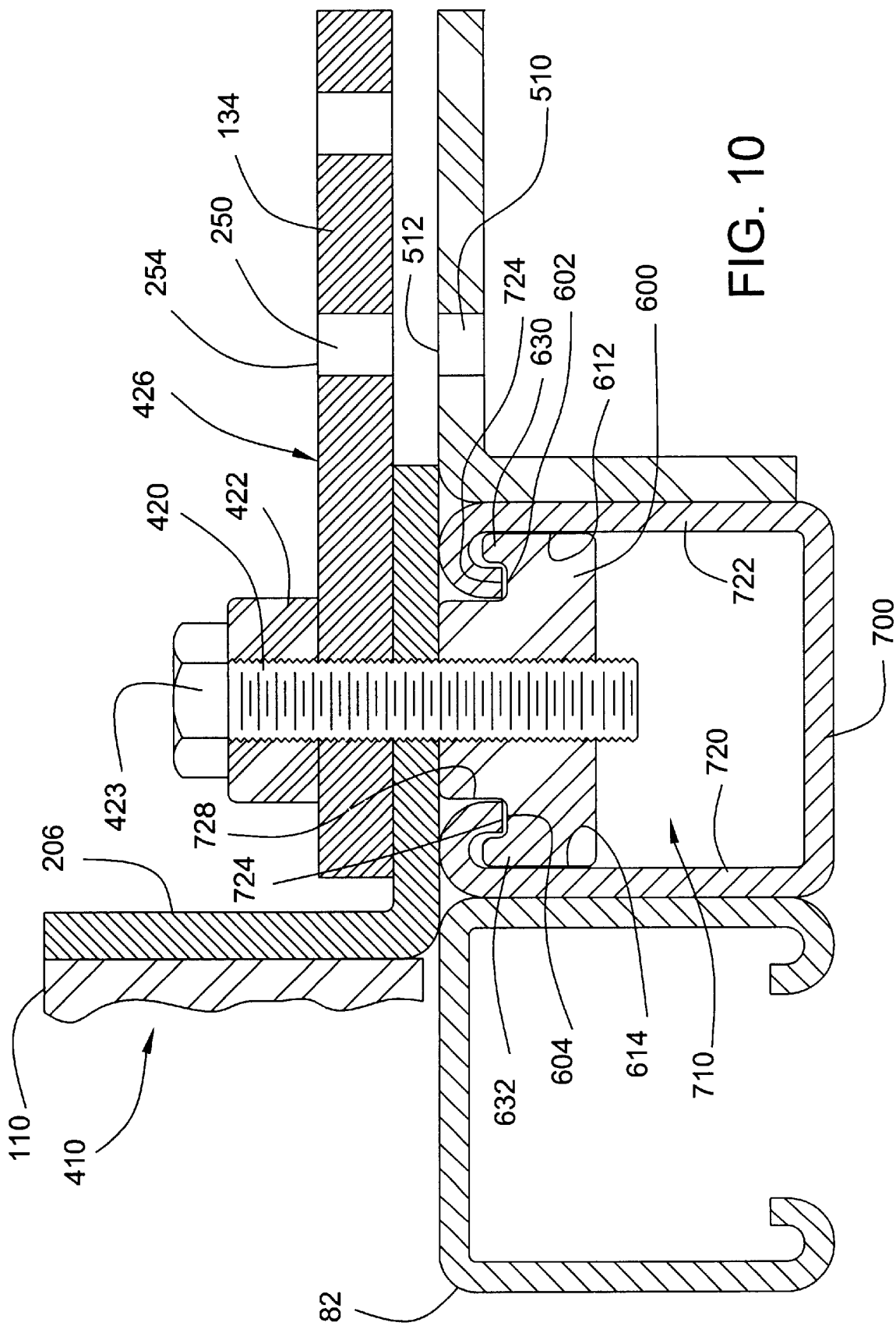
FIG. 10 is a view as in FIG. 9 with the first end of the rail assembly mounted to the right machine support arm by the twirl nut shown in FIG. 8.

Referring to FIG. 10, the front rail assembly 410 is mounted to the right support arm 82. The right end bracket 206 of the front rail 110 and the first plate 134 are mounted to the right support arm 82. The first bolt 420 and the twirl nut 600 interact to retain the end rail assembly 410. The twirl nut 600 is threadingly engaged to the first bolt 420. The notches 602, 604 of the twirl nut 600 and the hooked ends 724 of the first channel 700 are engaged to retain the twirl nut 600. To dispose the twirl nut 600 in the slot 710, the twirl nut 600 can be oriented with its ends 612, 614 substantially perpendicular to the side walls 720, 722 to allow the twirl nut 600 to fit within the opening 728. Once a pair of protruding portions 630, 632 moves past the hooked ends 724, the twirl nut 600 can be rotated axially until the ends 612, 614 contact the side walls 722, 720, respectively, to align the notches 602, 604 with the hooked ends 724. The first bolt 420 is turned to move the twirl nut 600 into engagement with the first channel 700.

The thrust bearing 422 is threadingly engaged to the first bolt 420. The first thrust bearing 422 is in close adjacency with the indicia surface 426 of the first plate 134. The thrust bearing is provided to prevent the bolt head from galling the first plate 134.

The first row 254 of locating holes 250 of the first plate 134 is aligned with the first row 512 of locating holes 510 of the right locating member 142.

Figure 11:
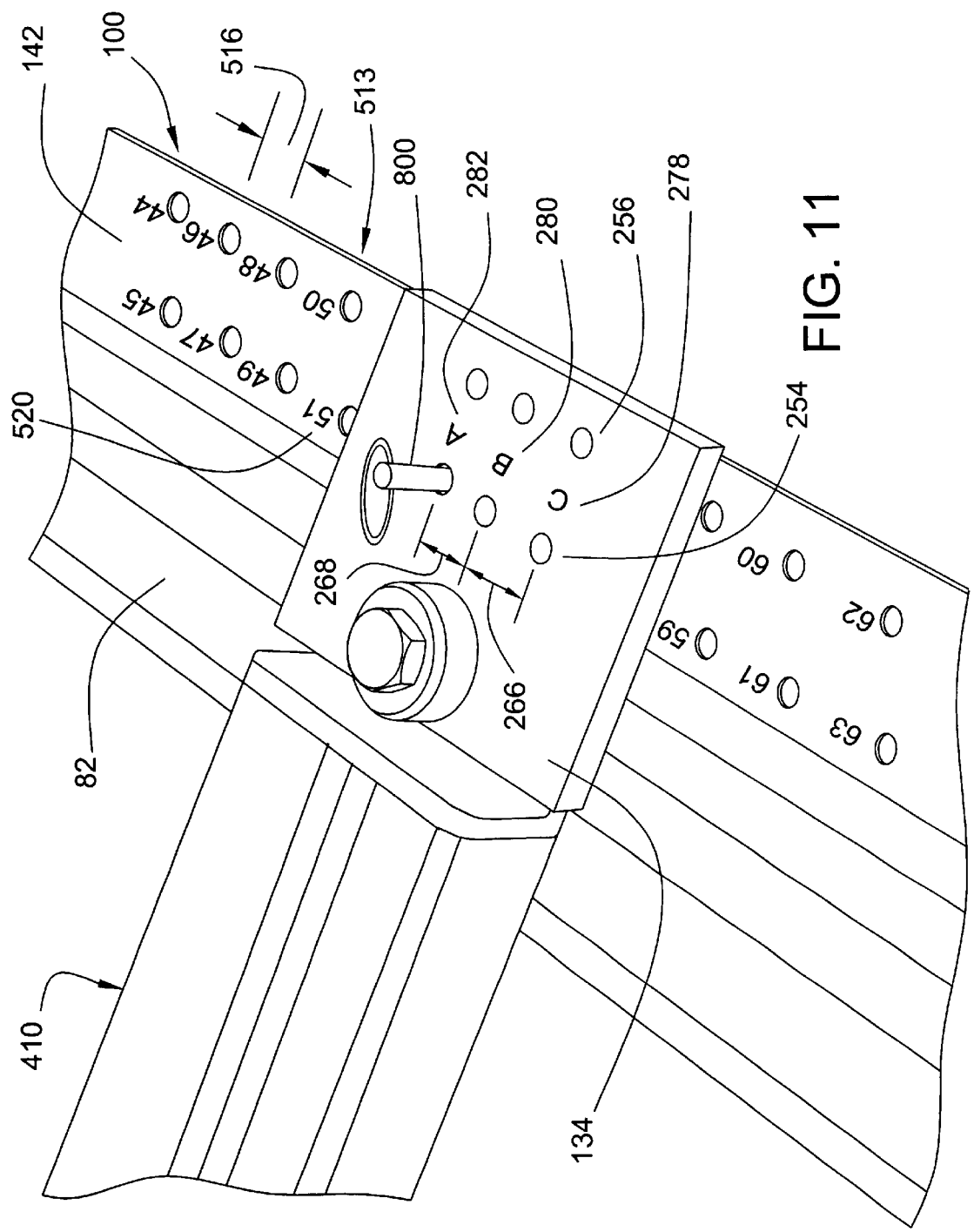
FIG. 11 is a perspective view of the front rail assembly located on the right machine support arm.

Referring to FIG. 11, the front rail assembly 410 is located on the right support arm 82 at a desired location in the front portion 513 of the locating member 142. The locating system 100 requires no measuring devices. The second and third distances 266, 268 of the first plate 134 and the distance 516 between adjacent locating holes 510 of the right locating member 142 cooperate to allow the front rail assembly 410 to be positioned in ⅛ inch increments along the longitudinal length of the right locating member 142. The first plate 134 of the front rail assembly 410 can be mounted to the right locating member 142 at a desired location by using an assembly code to match the indicia 278, 280, 282 of the first plate 134 to the indicia 520 of the right locating member 142. For rapid assembly, a locating pin or cotter pin 800, for example, can be inserted through the aligned holes to maintain the proper alignment between the first plate 134 and the right locating member 142. Alternatively, bolts, screws, clamps, or other techniques can be used to maintain such alignment.

An illustrative assembly code for mounting a front or a rear rail assembly includes a number portion and a letter portion. For example, the assembly code "53A" can indicate that the front and/or rear rail assembly is pinned at the locating hole 510 designated by the number "53" indicium of the locating member 142 and the locating hole 250 designated by the letter "A" of the first plate 134. In this embodiment, when the number portion of the assembly code is an odd number, it indicates that the locating hole 250 of the first row 254 is to be used. When the number portion of the assembly code is an even number, it indicates that the locating hole 250 of the second row 256 is to be used. As seen in FIG. 11, the locating hole 250 of the first row 254 marked by the letter "A" indicium 282 is aligned with the locating hole of the right locating member 142 marked by the number "53" indicium.

The second plate 136 of the front rail assembly 410 can be mounted to the left support arm and located using the left locating member in a similar fashion. The same assembly code used to locate the first plate 134 of the front rail assembly 410, for example "53A," can be used to located the second plate 136, as well. The rear rail assembly is mounted to the right and left support arms and located suing the right and the left locating members in a manner similar to the one described for the front rail assembly. Preferably the assembly code for the front rail assembly, for example "53A," can be used to locate the rear rail assembly in the rear portions of the left and right locating members.

Referring to FIG. 12, the front rail assembly 410 is depicted. In this embodiment, the front rail assembly 410 includes a shim bar 800, which acts as a spacer to dispose locating holes 810 of the front locating member 160 at selected positions to interconnect with the first and the second brackets 154, 156, as shown in FIG. 2. The shim bar 800 is connected to the first channel 200 of the front rail 110 by, for example, bolts, welds, or other techniques. The locating member 160 is connected to the shim bar 800 by, for example, bolts, welds, or other techniques. In other embodiments, the locating member 160 can be configured to dispose the locating holes 810 at the selected positions without the use of the shim bar 800. In those embodiments, the locating member 160 can be connected directly to the first channel 200.

Figure 13:
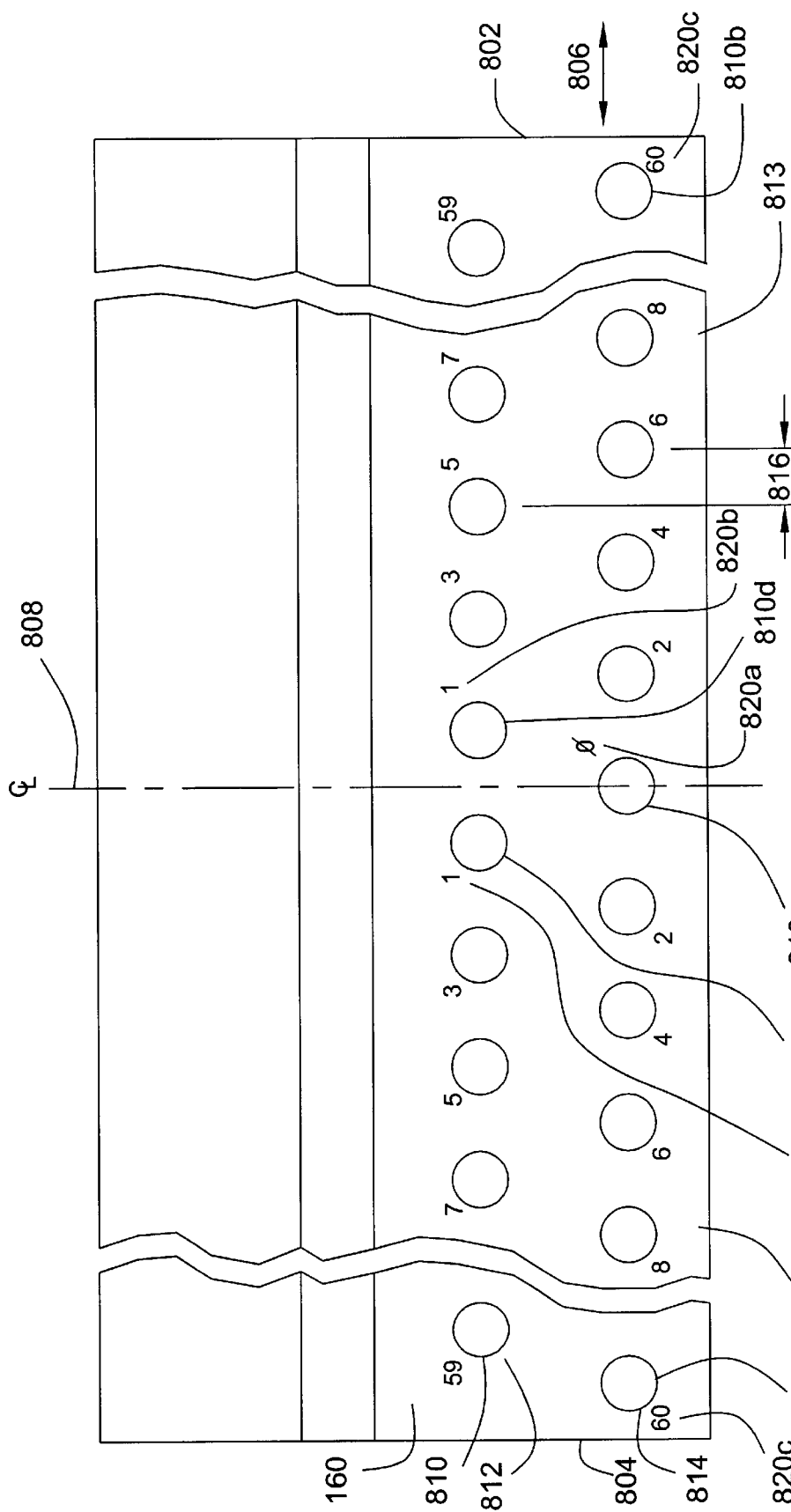
FIG. 13 is a side elevational view of the front rail assembly.

Referring to FIG. 13, the front locating member 160 is shown. The front locating member 160 can be used to position the left rail 114 and the right rail 116 relative to each other such that they are separated a predetermined distance 193, as shown in FIG. 2. The front locating member 160 includes a left end 802, a right end 804, a longitudinal axis 806, and a centerline 808. The front locating member 160 includes a plurality of locating holes 810, including a central hole 810a and a pair of end holes 810b, 810c. The locating holes 810 are alternately disposed in an array including two rows 812, 814 in lateral spaced relation to each other that are disposed substantially parallel to the longitudinal axis 806. The locating holes 810 are in spaced relation to each other. Adjacent locating holes 810 are separated a uniform, selected distance 816, such as half-inch spacing between center points of alternating adjacent locating holes 810.

The centerline 808 splits the front locating member 160 into a left portion 813 and a right portion 815. The central hole 810a is disposed at the centerline 808 of the front locating member 160. The central hole 810a can be labeled with an indicium 820a, such as the number "0." Additional indicia 820, preferably alphanumeric indicia, can be used to mark the remaining locating holes 810 to identify the position of the respective locating hole 810 relative to the central hole 810*a* and/or the centerline 808 of the front locating member 160. The left portion 813 and the right portion 815 use the same indicia 820 for locating holes 810 disposed an equal distance from the central hole 810*a*.

For example, an indicium 820*b* to mark the two locating holes 810*d*, 810*e* adjacent to the central hole 810*a* can be the number "1." Each remaining locating hole 810 can be identified by a successive integer indicium 820 moving toward the ends 802, 804 of the front locating member 160 such that the highest numbered indicium, in the illustrative front locating member 160 a number "60" indicium 820*c*, marks the end holes 810*b*, 810*c*. The indicia 820 can be used as a portion of an assembly code to readily assemble the clamp frame. It will be understood that in other embodiments, the longitudinal length of the front locating member 160 and the indicia 820 can be varied. In other embodiments, the indicia can be configured to identify the position of the respective locating hole relative to another position, such as an end hole.

The rear locating member 162, shown in FIG. 2, is similar in construction to the front locating member 160. The rear locating member 162 is configured such that its indicia correspond to, and align with, the indicia 820 of the front locating member 160.

Figure 18:
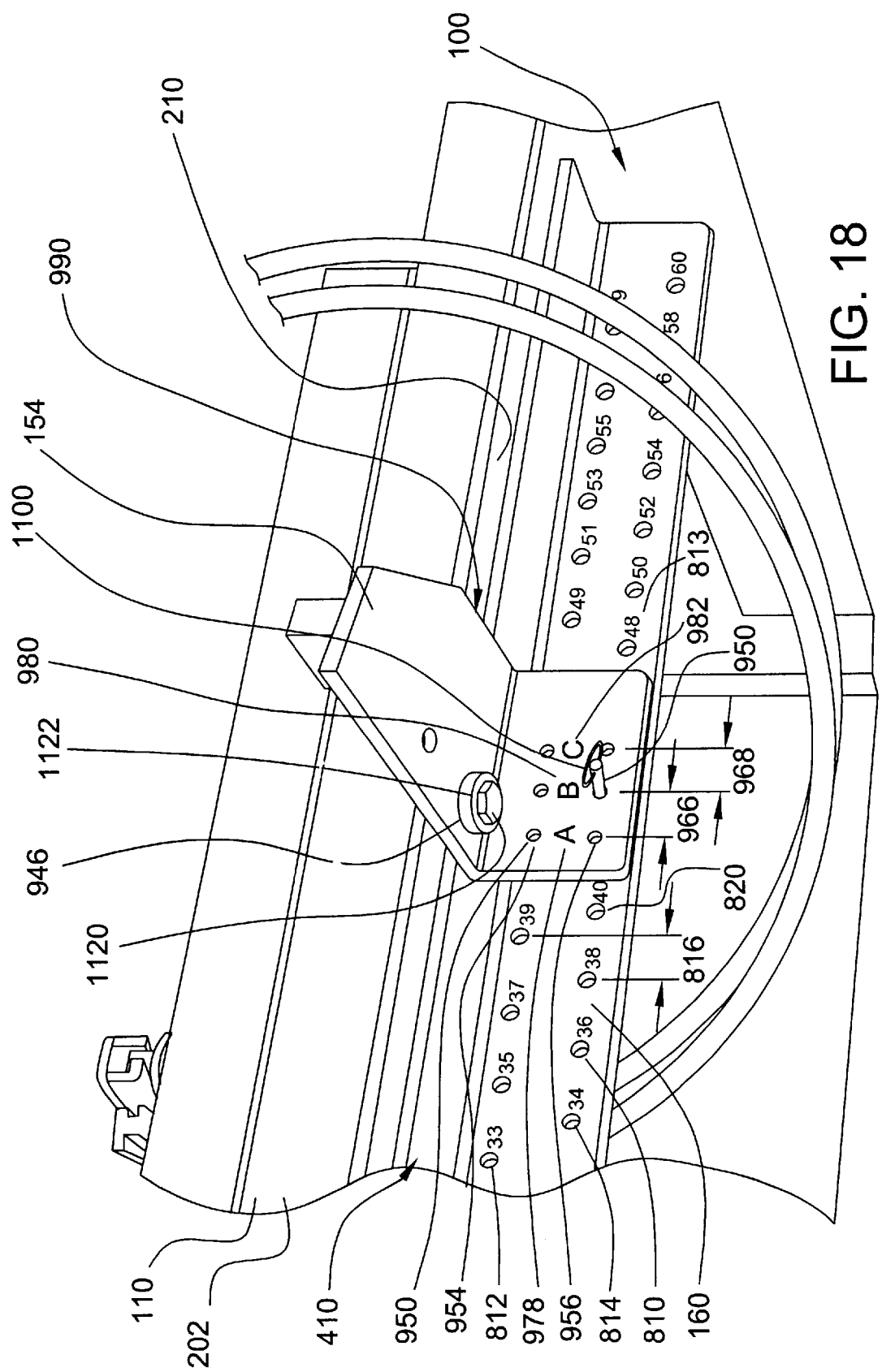
FIG. 18 is a perspective view of the first bracket shown in FIG. 14 mounted to the front rail assembly shown in FIG. 12.
Figure 20:
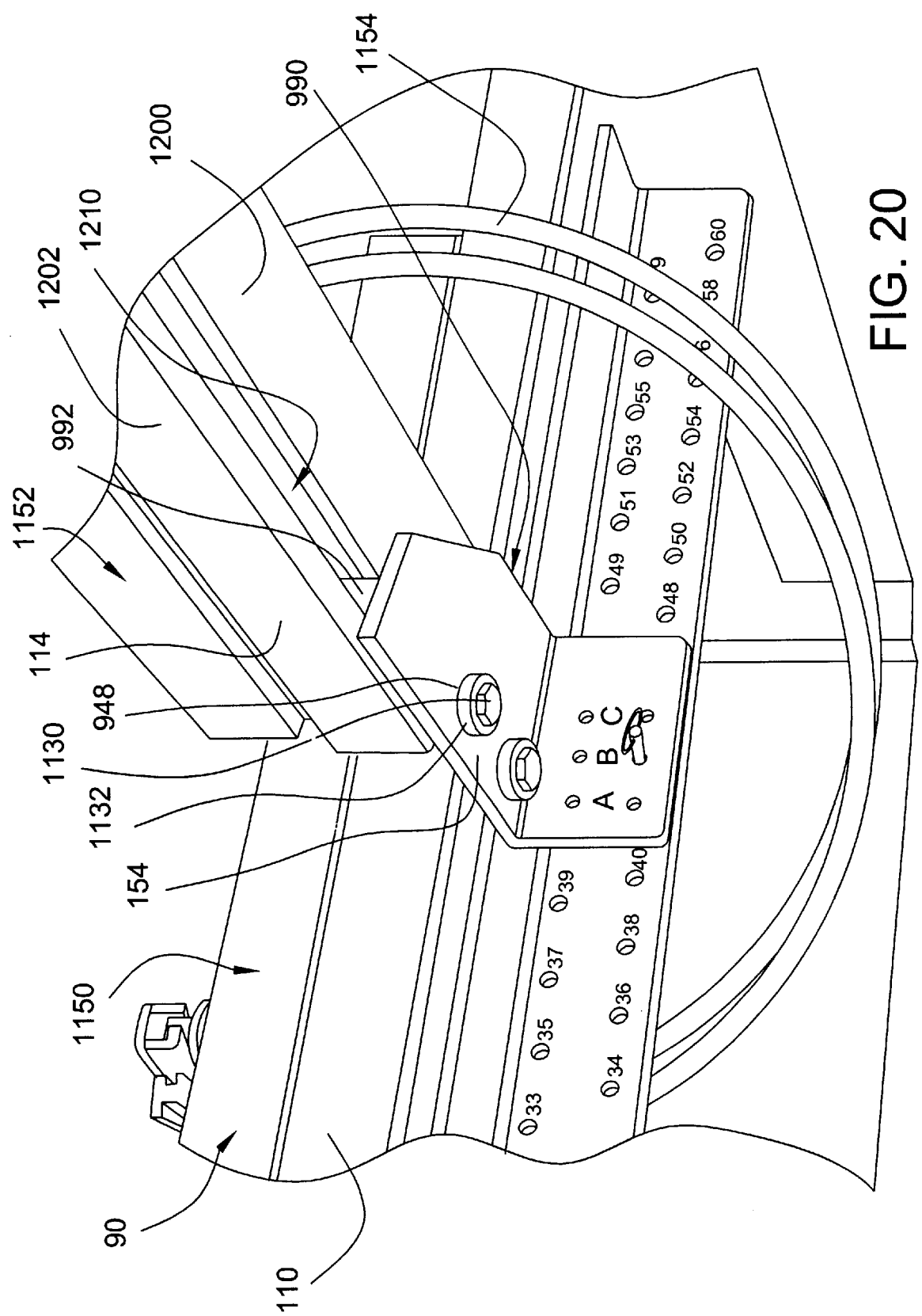
FIG. 20 is a perspective view of the side rail in FIG. 19 mounted to the first side bracket.

Referring to FIGS. 14 and 15, a first bracket 154 is shown. The first bracket 154 includes a first and a second mounting hole 946, 948 and a plurality of locating holes 950. The first mounting hole 946 is configured to align with the second channel 202 of the front rail 110 when the first bracket 154 is placed in adjacency with the front locating member 160, as shown in FIG. 18. The second mounting hole 948 of the first bracket 154 is configured to align with a second channel 1202 of the left rail 114 when the first bracket 154 is mounted to the front rail assembly 410, as shown in FIG. 20.

The locating holes 950 of the first bracket 154 are disposed in an array 952 with two rows 954, 956 and three columns 958, 960, 962. The rows 954, 956 are substantially linear and are in lateral spaced relation to each other at a selected first distance 964. The selected first distance 964 preferably substantially corresponds to the spacing of the rows 812, 814 of locating holes 810 of the front locating member 160 for alignment purposes, as shown in FIG. 13. The first column 958 and the second column 960 are in spaced relation to each other and are separated a selected second distance 966. The second column 960 and the third column 962 are in spaced relation to each other and are separated a selected third distance 968. The second distance 966 and the third distance 968 may be the same distance or may be different. For example, the illustrative second distance 966 is ⅝ of an inch, and the illustrative third distance 968 is ¾ of an inch. The second and third distances 966, 968 can be varied in other embodiments.

Each first bracket column 958, 960, 962 is preferably labeled with an indicium 978, 980, 982, respectively, such as an alphanumeric indicium, such as a letter. For example, the illustrative first indicium 978 is the letter "A." The illustrative second indicium 980 is the letter "B." The illustrative third indicium 982 is the letter "C." The indicia 978, 980, 982 can be used as a portion of an assembly code to readily assembly the clamp frame. It will be understood that in other embodiments, the indicia can be varied.

The first bracket 154 includes a first and a second guide member 990, 992. The guide members 990, 992 are disposed on a mating surface 993 of the first bracket 154. The guide members 990, 992 each include a longitudinal axis 994, 996, respectively. The guide members 990, 992 are configured with respect to each other such that the longitudinal axes 990, 992 are substantially perpendicular to each other. The guide members 990, 992 are each sized to closely fit within a slot of a channel such that when the guide members 990, 992 are disposed in the respective slot, the channels are substantially perpendicular to each other.

Figure 16:
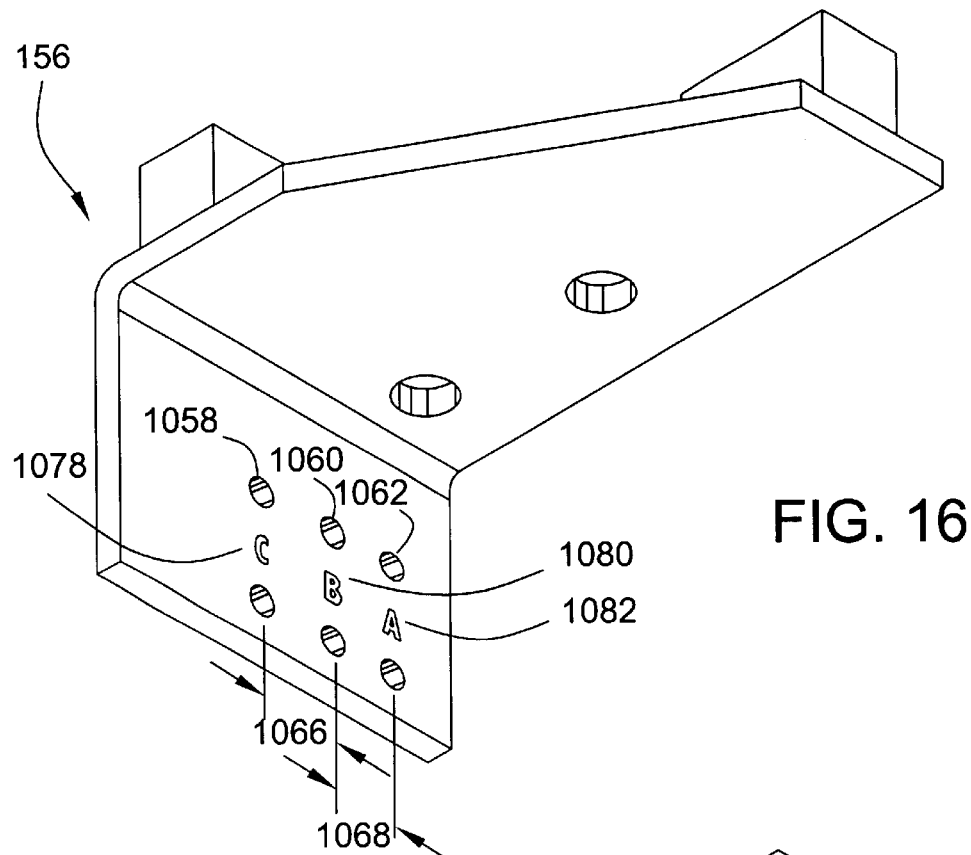
FIG. 16 is a bottom perspective view of a second bracket.
Figure 17:
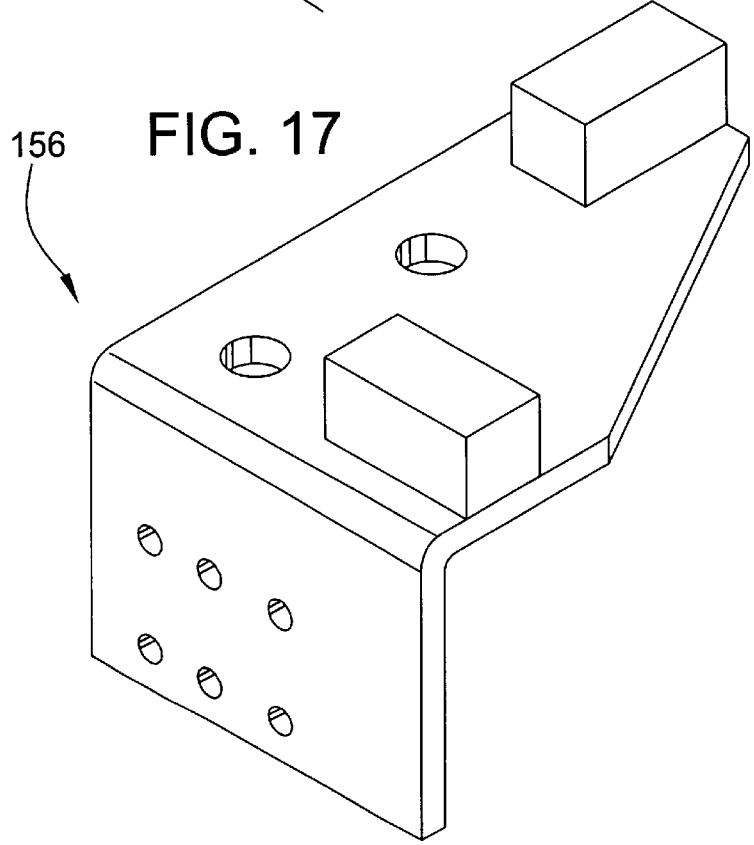
FIG. 17 is a top perspective view of the second bracket in FIG. 16.

Referring to FIGS. 16 and 17, a second bracket 156 is shown. The second bracket 156 is configured to correspond to the first bracket. A first column 1058 and a second column 1060 of locating holes 1050 are in spaced relation to each other and are separated a selected second distance 1066. The second column 1060 and a third column 1062 are in spaced relation to each other and are separated a selected third distance 1068. The selected second distance 1066 and the selected third distance 1068 may be the same distances or may be different distances. For example, the illustrative second distance 1066 is ¾ of an inch, and the illustrative third distance 1068 is ⅝ of an inch. The second and third distances 1066, 1068 can be varied.

Each second bracket column 1058, 1060, 1062 is preferably labeled with an indicium 1078, 1080, 1082, respectively, such as a letter. The indicia 1078, 1080, 1082 preferably correspond to the indicia of the first bracket. The illustrative first indicium 1078 is the letter "C." The illustrative second indicium 1080 is the letter "B." The illustrative third indicium 1082 is the letter "A." The indicia 1078, 1080, 1082 can be used as a portion of an assembly code to readily assembly the clamp frame. The second bracket 156 is similar to the first bracket 154 as shown in FIGS. 14 and 15 in other respects. It will be understood that in other embodiments, the indicia can be varied.

At least the first bracket 154 is used to position the left rail 114. Preferably, the first and second brackets are mounted at appropriate positions for positioning the left rail. Referring to FIG. 18, the first bracket 154 is mounted to the front rail assembly 410. A first bolt 1120 extends through the first mounting hole 946 of the first bracket 154. The first bolt 1120 is threadedly engaged to a twirl nut that is retentively engaged with the second channel 202 of the front rail 110. A thrust bearing 1122 is threadedly engaged to the first bolt 1120. The first guide member 990 is disposed within the slot 210 of the second channel 202. The first and second rows 954, 956 of locating holes 950 of the first bracket 154 are respectively aligned with the first and second rows 812, 814 of locating holes 810 of the front locating member 160.

The first bracket 154 is located on the front rail assembly 410 at a desired location in the left portion 813 of the front locating member 160. The locating system 100 requires no measuring devices. The second and third distances 966, 968 of the first bracket 154 and the distance 816 between adjacent locating holes 810 of the front locating member 160 cooperate to allow the first bracket 154 to be positioned in ⅛ inch increments along the longitudinal length of the front locating member 160. The first bracket 154 can be mounted to the front locating member 160 at a desired location by using an assembly code to match the indicia 978, 980, 982 of the first bracket 154 to the indicia 820 of the front locating member 160. For rapid assembly, a locating pin or cotter pin 1100, for example, can be inserted through the aligned holes to maintain the proper alignment between the first bracket 154 and the front locating member 160. Alternatively, bolts, screws, clamps, or other techniques can be used to maintain such alignment.

An illustrative assembly code for mounting a first or a second bracket includes a number portion and a letter portion. For example, the assembly code "42B" indicates the locating hole 810 designated by the number "42" indicium of the front locating member 160 and the locating hole 950 designated by the letter "B" indicium 980 of the first bracket 154. In this embodiment, when the number portion of the assembly code is an odd number, it indicates that the locating hole 950 of the first row 954 is to be used. When the number portion of the assembly code is an even number, it indicates that the locating hole 950 of the second row 956 is to be used. The locating hole 950 of the second row 956 marked by the letter "B" indicium 980 is aligned with the locating hole of the front locating member 160 marked by the number "42" indicium.

The second bracket can be mounted to the rear rail assembly in a similar fashion using the same assembly code used to locate the first plate 134 of the front rail assembly 410, for example "53A." To readily align the left rail by using a single assembly code, the second bracket is configured such that when it is mounted to the rear rail assembly, the indicia of the second bracket correspond to the indicia of the first bracket 154. For example, the indicia 978, 980, 982 of the first bracket 154 can be aligned respectively with the indicia 1082, 1080, 1078 of the second bracket 156 such that the columns 958, 960, 962 of the first bracket 154 are respectively aligned with the columns 1062, 1060, 1058 of the second bracket 156. For example, an assembly code including a letter designation "B" directs the user to mount the first bracket 154 to the front rail assembly using the second column 960 and the second bracket 56 to the rear rail assembly using the second column 1060, as well. While only one bracket may be necessary to position the left or the right rail, preferably two brackets, one at either end of each rail, are used.

To locate the right rail, the other set of first and second brackets can be mounted to the rear and front rail assemblies, respectively, in a manner similar to the one described for the first set of brackets. Preferably the assembly code, for example "53A," for the brackets used with the left rail can be used to locate the brackets used with the right rail, as well.

Figure 19:
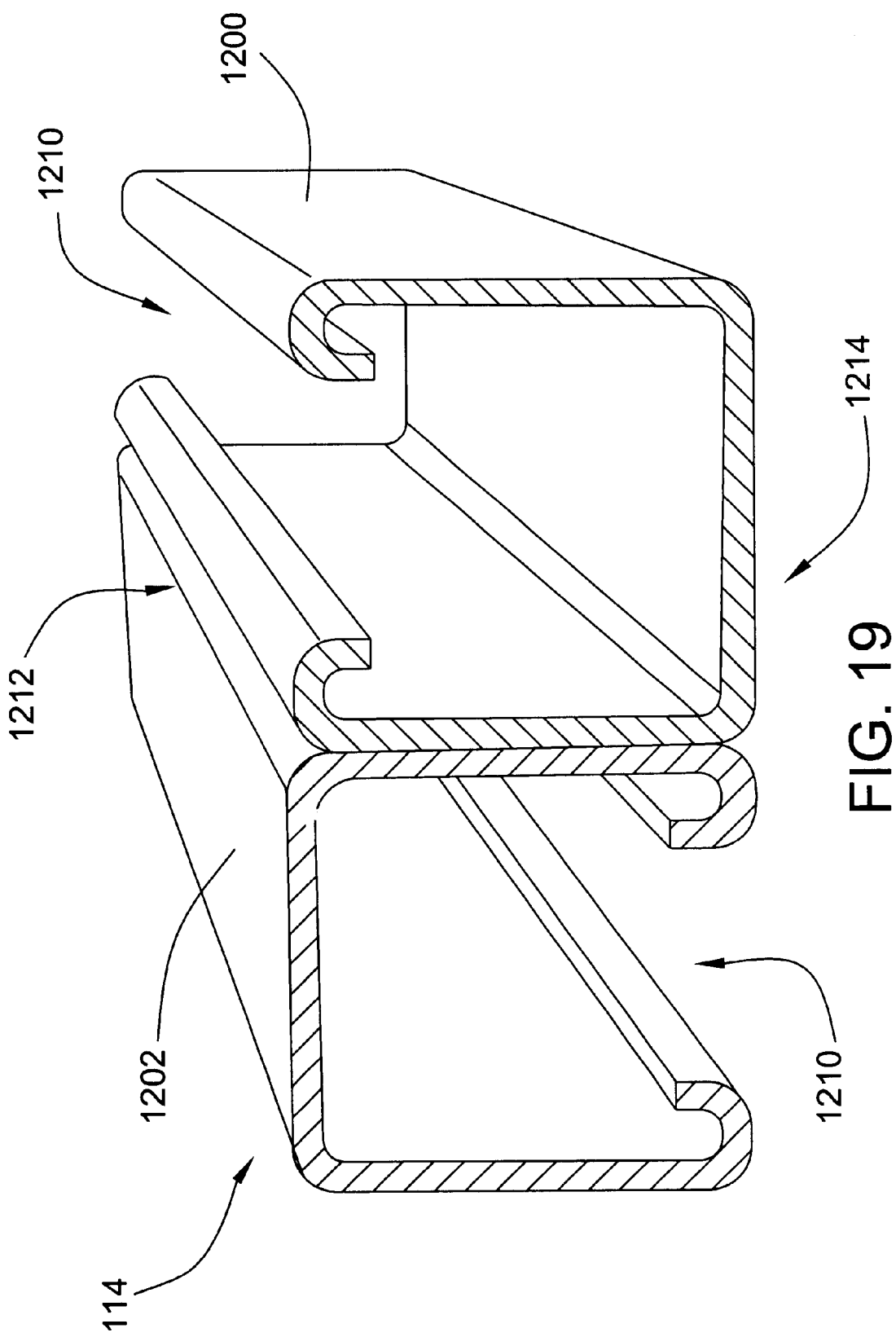
FIG. 19 is a perspective view of a left side rail.

Referring to FIG. 19, the left rail 114 is shown. The illustrative left rail 114 includes a first channel 1200 and a second channel 1202. The first channel 1200 and the second channel 1202 are similar to each other. Each channel 1200, 1202 is U-shaped to define a slot 1210. The slot 1210 can be used for mounting other components such as air piston and clamping bar assemblies. The channels 1200, 1202 are connected together by, for example, bolts, welds, or other techniques. The slot 1210 of the first channel 1200 opens to a top surface 1212 of the left rail 114. The slot 1210 of the second channel 1202 opens to a bottom surface 1214 of the left rail 114. The exemplified channels 1200, 1202 are available from GS Metals Corp., Pinckneyville Ill. 62274, under the GLOBESTRUT™ metal framing trade name as part number G-5814X Referring to FIG. 20, the left rail 114 is mounted to the first bracket 154. A second bolt 1130 extends through the second mounting hole 948 of the first bracket 154. The second bolt 1130 is threadedly engaged to a twirl nut that is retentively engaged with the second channel 1202 of the left rail 114. A thrust bearing 1132 is threadedly engaged to the second bolt 1130. The second guide member 992 is disposed within the slot 1210 of the second channel 1202 of the left rail 114. The first and second guide members 990, 992 operably engage the front rail 110 and the left rail 114, respectively, to align the front rail and the left rail substantially perpendicular to each other.

A first air piston and clamping bar assembly 1150 is mounted to the first channel of the front rail 110. A second air piston and clamping bar assembly 1152 is mounted to the first channel 1200 of the left rail 114. The air piston and clamping bar assemblies 1150, 1152 can move from an open position to a clamped position and are used to retain a sheet installed in the assembled clamp frame 90. The illustrative air piston and clamping bar assemblies 1150, 1152 are driven by compressed air fed to the assemblies 1150, 1152 by a plurality of lines 1154. In other embodiments, other types of clamps can be used.

Referring to FIG. 2, in the illustrated embodiment, to facilitate assembly of the clamp frame and to ensure accurate assembly, the first and the second plates 134, 136 and the first and the second brackets 154, 156 can be oriented such that the letter "A" indicia of each of the plates and the brackets is the closest indicia to the rectangular opening 120. To assemble the adjustable clamp frame 90 using the locating system 100, the front rail assembly 410 can be located at a predetermined location using a first assembly code for the second plate 136 on the front rail 110 and the left locating member 140 and a second assembly code for the first plate 134 and the right locating member 142. The rear rail assembly 412 can be located at a predetermined location using a third assembly code for the first plate 134 on the rear rail 112 and the left locating member 140 and a fourth assembly code for the second plate 136 and the right locating member 142. Preferably the first assembly code and the second assembly code are the same. Preferably the third assembly code and the fourth assembly code are the same. More preferably, the first assembly code, the second assembly code, the third assembly code, and the fourth assembly code are the same.

The left rail 114 can be located at a predetermined location using a fifth assembly code for the first bracket 154 and the front locating member 160 to mount the first bracket 154 to the front rail 110 and a sixth assembly code for the second bracket 156 and the rear locating member 162 to mount the second bracket 156 to the rear rail 112. The right rail 116 can be located at a predetermined location using a seventh assembly code for the second bracket 156 and the front locating member 160 to mount the second bracket 154 to the front rail 110 and an eight assembly code for the first bracket 154 and the rear locating member 162 to mount the first bracket 154 to the rear rail 112. Preferably the fifth assembly code and the sixth assembly code are the same. Preferably the seventh assembly code and the eighth assembly code are the same. More preferably, the fifth assembly code, the sixth assembly code, the seventh assembly code, and the eighth assembly code are the same.

To predetermine the appropriate assembly code for a desired mold platen, the appropriate size of the opening 120 can be predetermined by adjusting the clamp frame in the traditional manner at the molding station. The location of the rails can be noted and designated according to the appropriate assembly codes. The various assembly codes for a particular mold can be collected to provide an assembly code set and recorded on a set-up sheet.

The inventive locating system allows the clamp frames to be set up at the loading station rather than at the forming station. By setting up the clamp frame at the loading station, the molding machine can be properly configured rapidly. With some workers setting up the clamp frames at the loading station, other workers can be positioning the desired mold and other components at the forming station at the same time.

Although the illustrative embodiments includes rails with a plurality of channels, it will be understood that the inventive locating system is adaptable for use with other types of clamp frames, such as those using unitary rails and/or those without channels defining slots. Furthermore, although a bolt and a twirl nut are used in the illustrative embodiment, other types of connections, such as bolts and standard nuts, screws, clamps, toggle bolts, or other techniques, between the locating system and the clamp frame and/or the molding machine are possible.

All references, including publications, patent applications and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the present invention (especially in the context of the following claims) are to be construed to cover both the singular and the plural, unless otherwise indicated herein or clearly contradicted by context. The use of terms "including", "having" and "comprising" and like terms are to be construed as open ended terms, meaning including, but not limited to, unless otherwise indicated, or clearly contradicted by context, herein. The use of any and all examples, or exemplary language (e.g., "such as") provided herein is intended merely to better illuminate the present invention and does not pose a limitation on the scope of the claimed invention. No language in the specification should be construed as indicating any non-claimed element as essential to the practice of the invention.

The foregoing is an integrated description of the invention as a whole, not merely of any particular element or facet thereof. The description describes "preferred embodiments" of this invention, including the best mode known to the inventors for carrying it out. Of course, upon reading the foregoing description, variations of those preferred embodiments will become obvious to those of ordinary skill in the art. The inventors expect skilled artisans to employ such variations as appropriate, and the inventors intend for the invention to be practiced otherwise than as specifically described herein. Accordingly this invention includes all modifications and equivalents of the subject matter recited in the claims appended hereto as permitted by applicable law. Moreover, any combination of the above-described elements in all possible variations thereof is possible unless otherwise indicated herein or otherwise clearly contradicted by context.

What is claimed is:

1. A locating system for positioning a frame for use in a molding system, the frame including a front rail, a rear rail, a left rail, and a right rail, the locating system comprising:
    at least one first locating member configured to indicate the positions of the front rail and the rear rail; and
    at least one second locating member configured to indicate the positions of the left rail and the right rail, the first locating member being mounted to a first support arm of a molding machine, and the second locating member being mounted to a second support arm of a molding machine.

2. The locating system of claim 1 wherein the second locating member is disposed perpendicular to the first locating member.

3. The locating system of claim 1 wherein the first locating member includes a plurality of locating holes in spaced relation to each other.

4. The locating system of claim 3 wherein adjacent locating holes are disposed in ½ inch on-center relation.

5. The locating system of claim 3 wherein the first locating member includes a plurality of indicia, the indicia corresponding to each of the locating holes.

6. The locating system of claim 5 wherein the indicia comprise a plurality of numbers.

7. The locating system of claim 5 wherein the first locating member includes a central locating hole, the central locating hole being disposed at a centerline of the first locating member.

8. The locating system of claim 7 wherein the first locating member includes a first end locating hole and a second end locating hole, the locating holes between the central locating hole and the first end locating hole each identified by a successive alphanumeric indicium, and the locating holes between the central locating hole and the second end locating hole each identified by a successive alphanumeric indicium.

9. The locating system of claim 1 wherein the first locating member includes a plurality of indicia, the indicia corresponding to each of the locating holes.

10. The locating system of claim 9 wherein the indicia comprise a plurality of numbers.

11. The locating system of claim 1 wherein the first locating member includes a plurality of locating holes and wherein said locating system further comprises a plate, the plate including an array of locating holes, the locating holes of the plate operable to align with locating holes of the first locating member.

12. The locating system of claim 11 wherein the array of locating holes includes at least six holes arranged in three columns of two holes each.

13. The locating system of claim 12 wherein each of the columns is identified by alphanumeric indicia.

14. The locating system of claim 1 wherein the second locating member includes a plurality of locating holes and wherein said locating system further comprises a bracket, the bracket including an array of locating holes, the locating holes of the bracket operable to align with locating holes of the second locating member.

15. The locating system of claim 14 wherein the array of locating holes includes at least six holes arranged in three columns of two holes each.

16. The locating system of claim 15 wherein the columns are identified by alphanumeric indicia.

17. A locating system for positioning a frame for use in a molding system, the locating system comprising:
    means for locating a front rail and a rear rail, at least a portion of the means for locating the front and rear rails being mounted to a first support arm of a molding machine; and
    means for locating a left rail and a right rail.

18. The locating system of claim 17 wherein the means for locating a front rail and a rear rail includes at least a first plate mounted to the front rail and at least a second plate mounted to the rear rail.

19. The locating system of claim 17 wherein the means for locating a left rail and a right rail includes at least a first bracket mounted to the left rail and at least a second bracket mounted to the right rail.

20. A locating system for positioning a frame for use in a molding system, the frame including a front rail, a rear rail, a left rail, and a right rail, the locating system comprising:
    first and second locating members configured to position the front rail and the rear rail, the first and the second locating members disposed in substantially parallel spaced relation to one another, the first locating member being mounted to a first support arm of a molding machine, and the second locating member being mounted to a second support arm of a molding machine; and third and fourth locating members mounted to the front rail and the rear rail, respectively, and the third and the fourth locating members configured to position the left rail and the right rail.

21. A locating system for positioning a frame for use in a molding system, the frame including a front rail, a rear rail, a left rail, and a right rail, the locating system comprising:

first and second locating members configured to position the front rail and the rear rail, the first and the second locating members disposed in substantially parallel spaced relation to one another, the first locating member being mounted to a first support arm of a molding machine, and the second locating member being mounted to a second support arm of a molding machine;

first and second plates mounted to the front rail;

third and fourth plates mounted to the rear rail;

third and fourth locating members mounted to the front rail and the rear rail, respectively, the third and the fourth locating members configured to position the left rail and the right rail;

first and second brackets mounted to the left rail for positioning said left rail along said front and rear rails and relative to the right rail; and third and fourth brackets mounted to the right rail for positioning said right rail along said front and rear rails and relative to the left rail.

22. The locating system of claim 21 wherein the first and the second set of plates include indicia that are operable to align with indicia of the first and the second locating members.

23. The locating system of claim 22 wherein the first and the second set of brackets include indicia that are operable to align with indicia of the third and the fourth locating members.

24. The locating system of claim 22 wherein the front rail includes a pair of channels.

25. The locating system of claim 22 wherein the first plate is mounted to the front rail by a bolt, a thrust bearing and a twirl nut.

26. The locating system of claim 21 wherein the first and the second set of brackets rackets include indicia that are operable to align with indicia of the third and the fourth locating members.

27. A method for positioning an adjustable clamp frame for use in a molding system, the frame including a front rail, a rear rail, a left rail, and a right rail, the method comprising:

locating a first plate on the front rail at a predetermined location along a first locating member and locking the first plate in position;

locating a second plate on the rear rail at a predetermined location along the first locating member and locking the second plate in position;

locating a first bracket on the left rail at a predetermined location along a second locating member and locking the first bracket in position;

locating a second bracket on the right rail at a predetermined location along the second locating member and locking the second bracket in position;

wherein the predetermined locations are designated by an assembly code set.

28. The method of claim 22 wherein the first locating member is attached to a first support arm of a molding machine.

29. The method of claim 27 wherein the second locating member is mounted to said front rail or said rear rail.

30. The method of claim 27 wherein the plates and the brackets are each locked in position by a pin.

31. A bracket for positioning an adjustable clamp frame for use in a molding system comprising:

an array of locating holes, the locating holes of the bracket operable to align with locating holes of a locating member, the array of locating holes including at least six holes arranged in three columns of two holes each, the columns being identified by alphanumeric indicia; and a first guide member and a second guide member, the first guide member disposed perpendicular to the second guide member, the first and second guide members configured to fit within a slot of a first channel and a slot of a second channel, respectively, to orient the channels perpendicular to each other.

32. A method for positioning an adjustable clamp frame for use in a molding system, the frame including a front rail, a rear rail, a left rail, and a right rail, the method comprising:

locating a first plate on the front rail at a predetermined location along a first locating member and locking the first plate in position, the first locating member being attached to a first support arm of a molding machine;

locating a second plate on the rear rail at a predetermined location along the first locating member and locking the second plate in position;

locating a first bracket on the left rail at a predetermined location along a second locating member and locking the first bracket in position;

locating a second bracket on the right rail at a predetermined location along the second locating member and locking the second bracket in position.

33. The method of claim 32 wherein the predetermined locations are designated by an assembly code set.

34. The method of claim 32 wherein the second locating member is mounted to said front rail or said rear rail.

35. The method of claim 32 wherein the plates and the brackets are each locked in position by a pin.

36. An adjustable clamp frame for use in a molding system having a molding machine with a first support arm and a second support arm, the adjustable clamp frame comprising:

a first locating member attached to the first support arm of the molding machine, the first locating member having indicia disposed thereon;

a front rail assembly including a front rail and a second locating member, the second locating member having indicia disposed thereon, the front rail assembly mounted to the first and second support arms at a predetermined position along the first locating member;

a rear rail mounted to the first and second support arms at a predetermined position along the first locating member, the rear rail in spaced relationship to the front rail assembly;

a left rail mounted to the front and rear rails at a predetermined position along the second locating member;

and a right rail mounted to front and rear rails at a predetermined position along the second locating member, the right rail in spaced relationship to the left rail;

wherein the front, rear, left, and right rails define an opening, the indicia on the first and second locating members identify the size of opening, and the size of the opening is adjustable by changing the relative position of the rails along the first and second locating members.

* * * * *

UNITED STATES PATENT AND TRADEMARK OFFICE
CERTIFICATE OF CORRECTION

PATENT NO. : 6,530,158 B2
DATED : March 11, 2003
INVENTOR(S) : Brian G. Lagron, Brian L. Wegstein and Randall E. Baldwin It is certified that error appears in the above-identified patent and that said Letters Patent is hereby corrected as shown below:

Column 7,
Line 22, "Tindicia" should read -- The indicia --.
Line 23, "assembly the" should read -- assembly code to readily assemble the --

The dependency of claim 23 should be on claim 21.

Signed and Sealed this

Sixteenth Day of December, 2003

JAMES E. ROGAN
*Director of the United States Patent and Trademark Office*